United States Patent
Cho et al.

(10) Patent No.: US 12,463,351 B2
(45) Date of Patent: Nov. 4, 2025

(54) ANTENNA MODULE AND ELECTRONIC DEVICE FOR USING THE ANTENNA MODULE

(71) Applicant: Samsung Electronics Co., Ltd., Gyeonggi-do (KR)

(72) Inventors: Namjun Cho, Gyeonggi-do (KR); Hyoseok Na, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 0 days.

(21) Appl. No.: 17/226,912

(22) Filed: Apr. 9, 2021

(65) Prior Publication Data

US 2021/0226339 A1 Jul. 22, 2021

Related U.S. Application Data

(63) Continuation of application No. 16/985,674, filed on Aug. 5, 2020.

(30) Foreign Application Priority Data

Aug. 5, 2019 (KR) .................. 10-2019-0094745
Jul. 29, 2020 (KR) .................. 10-2020-0094609

(51) Int. Cl.
*H01Q 21/00* (2006.01)
*H01Q 1/24* (2006.01)
(Continued)

(52) U.S. Cl.
CPC ......... *H01Q 21/0025* (2013.01); *H01Q 1/245* (2013.01); *H01Q 1/38* (2013.01); *H01Q 21/24* (2013.01); *H04B 7/0404* (2013.01)

(58) Field of Classification Search
CPC ..... H04B 7/04–0413; H01Q 1/00–528; H01Q 21/00–30
See application file for complete search history.

(56) References Cited

U.S. PATENT DOCUMENTS 5,722,040 A 2/1998 Bjerede et al.
6,362,784 B1 3/2002 Kane et al.
(Continued)

FOREIGN PATENT DOCUMENTS

CN 108448230 8/2018
CN 110063033 7/2019
(Continued)

OTHER PUBLICATIONS

Australian Examination Report dated Feb. 17, 2021 issued in counterpart application No. 2020213328, 6 pages.
(Continued)

*Primary Examiner* — Gennadiy Tsvey
(74) *Attorney, Agent, or Firm* — The Farrell Law Firm, P.C.

(57) ABSTRACT

A mobile communication device includes a processor positioned on a first printed circuit board, a radio frequency integrated circuit (RFIC), and an antenna module. The antenna module includes a second printed circuit board, a first antenna and a second antenna positioned on the second printed circuit board, and a plurality of front-end chips positioned on the second printed circuit board. The plurality of front-end chips include a first front-end chip electrically connecting the RFIC and the first antenna, and a second front-end chip electrically connecting the RFIC and the second antenna.

12 Claims, 16 Drawing Sheets

(51) Int. Cl.
*H01Q 1/38* (2006.01)
*H01Q 21/24* (2006.01)
*H04B 7/0404* (2017.01)

(56) References Cited

U.S. PATENT DOCUMENTS

| | | | | |
|---|---|---|---|---|
| 7,265,719 | B1* | 9/2007 | Moosbrugger | H01Q 21/065 343/893 |
| 9,614,552 | B2* | 4/2017 | Kim | H04L 27/2014 |
| 10,693,687 | B1* | 6/2020 | Kushnir | H04L 27/0014 |
| 10,804,597 | B2 | 10/2020 | Xia et al. | |
| 10,868,362 | B2 | 12/2020 | Yun et al. | |
| 11,296,745 | B2 | 4/2022 | Shimura | |
| 2002/0122006 | A1* | 9/2002 | Crawford | H01Q 9/0407 343/702 |
| 2003/0162566 | A1* | 8/2003 | Shapira | H04W 16/28 455/562.1 |
| 2006/0244671 | A1* | 11/2006 | Ohata | H01P 1/15 343/776 |
| 2009/0051601 | A1 | 2/2009 | Lee et al. | |
| 2009/0280866 | A1 | 11/2009 | Lo et al. | |
| 2011/0057859 | A1 | 3/2011 | Rho et al. | |
| 2012/0068896 | A1 | 3/2012 | White et al. | |
| 2012/0088547 | A1* | 4/2012 | Lee | H04M 1/2755 455/556.2 |
| 2013/0050056 | A1* | 2/2013 | Lee | H01Q 3/30 343/893 |
| 2013/0072125 | A1* | 3/2013 | Yoon | H01P 1/10 455/67.11 |
| 2013/0244591 | A1 | 9/2013 | Weissman et al. | |
| 2014/0104106 | A1* | 4/2014 | Corman | H03H 11/36 342/363 |
| 2014/0225806 | A1* | 8/2014 | Lee | H01Q 1/243 343/905 |
| 2014/0256376 | A1 | 9/2014 | Weissman et al. | |
| 2014/0378182 | A1 | 12/2014 | Hara et al. | |
| 2015/0038185 | A1 | 2/2015 | Saban et al. | |
| 2015/0119102 | A1 | 4/2015 | Saji et al. | |
| 2015/0123873 | A1* | 5/2015 | Perumana | H01Q 3/24 343/876 |
| 2016/0150542 | A1 | 5/2016 | Mehraban et al. | |
| 2016/0150591 | A1* | 5/2016 | Tarighat Mehrabani | H04W 52/38 370/329 |
| 2016/0178730 | A1 | 6/2016 | Trotta et al. | |
| 2016/0248451 | A1 | 8/2016 | Weissman et al. | |
| 2016/0329631 | A1 | 11/2016 | Rheinfelder | |
| 2016/0359461 | A1* | 12/2016 | He | H01L 23/66 |
| 2017/0214519 | A1 | 7/2017 | Park et al. | |
| 2018/0062731 | A1 | 3/2018 | Ng et al. | |
| 2018/0145718 | A1 | 5/2018 | Margomenos | |
| 2018/0219587 | A1* | 8/2018 | Huo | H04B 1/40 |
| 2018/0294858 | A1* | 10/2018 | Pehlke | H04B 1/40 |
| 2018/0358686 | A1 | 12/2018 | Park | |
| 2019/0027838 | A1 | 1/2019 | Paulotto | |
| 2019/0036207 | A1 | 1/2019 | Kim et al. | |
| 2019/0081596 | A1* | 3/2019 | Dunworth | H03H 7/48 |
| 2019/0103653 | A1 | 4/2019 | Jeong et al. | |
| 2019/0103682 | A1* | 4/2019 | Thai | H01Q 9/28 |
| 2019/0131691 | A1* | 5/2019 | Hong | H01Q 3/40 |
| 2019/0158130 | A1* | 5/2019 | Achour | H04B 1/0064 |
| 2019/0158154 | A1 | 5/2019 | Na | |
| 2019/0165452 | A1* | 5/2019 | Jeon | H01Q 9/0421 |
| 2019/0165454 | A1* | 5/2019 | Lee | H01Q 1/245 |
| 2019/0165473 | A1* | 5/2019 | Yun | H01Q 21/062 |
| 2019/0165478 | A1 | 5/2019 | Jo et al. | |
| 2019/0229413 | A1 | 7/2019 | Jong et al. | |
| 2019/0237879 | A1 | 8/2019 | Park et al. | |
| 2019/0267709 | A1* | 8/2019 | Mow | H01Q 21/24 |
| 2019/0280394 | A1* | 9/2019 | Cheng | H01Q 3/44 |
| 2019/0319663 | A1 | 10/2019 | Shimura | |
| 2019/0334228 | A1 | 10/2019 | Haridas et al. | |
| 2019/0372229 | A1* | 12/2019 | Dalmia | H01Q 9/0407 |
| 2019/0379119 | A1 | 12/2019 | He et al. | |
| 2019/0386380 | A1* | 12/2019 | Ham | H01Q 1/243 |
| 2019/0386397 | A1* | 12/2019 | Son | H04B 1/006 |
| 2020/0014119 | A1 | 1/2020 | Kim et al. | |
| 2020/0021015 | A1* | 1/2020 | Yun | H01Q 1/2283 |
| 2020/0036083 | A1 | 1/2020 | Kim et al. | |
| 2020/0044709 | A1* | 2/2020 | Kang | H04W 56/0015 |
| 2020/0083948 | A1 | 3/2020 | Lim et al. | |
| 2020/0091581 | A1* | 3/2020 | Ou | H05K 1/141 |
| 2020/0091608 | A1 | 3/2020 | Alpman et al. | |
| 2020/0106187 | A1 | 4/2020 | Ou et al. | |
| 2020/0144733 | A1* | 5/2020 | Chakraborty | H01Q 21/245 |
| 2020/0227811 | A1 | 7/2020 | Dalmia | |
| 2020/0235774 | A1* | 7/2020 | Lee | H03F 3/19 |
| 2020/0244302 | A1* | 7/2020 | Chi | H04B 1/44 |
| 2020/0295450 | A1 | 9/2020 | Park et al. | |
| 2020/0373647 | A1* | 11/2020 | Lee | H01Q 1/243 |
| 2021/0036741 | A1* | 2/2021 | Park | H04B 7/0695 |
| 2021/0044002 | A1* | 2/2021 | Lee | H01Q 3/34 |
| 2021/0083400 | A1* | 3/2021 | Hong | H04B 17/318 |
| 2021/0234259 | A1* | 7/2021 | Son | H01Q 1/38 |
| 2021/0305694 | A1* | 9/2021 | Kim | H04B 7/0682 |
| 2021/0305739 | A1* | 9/2021 | Ghim | H04M 1/0277 |
| 2022/0159540 | A1* | 5/2022 | Park | H04W 36/36 |

FOREIGN PATENT DOCUMENTS

| | | |
|---|---|---|
| JP | 6531786 | 6/2019 |
| KR | 1020110025547 | 3/2011 |
| KR | 1020170115780 | 10/2017 |
| KR | 1020170115870 | 10/2017 |
| KR | 20190013381 | 2/2019 |
| KR | 20190026449 | 3/2019 |
| KR | 1020190049300 | 5/2019 |
| KR | 1020190050137 | 5/2019 |
| KR | 1020190090292 | 8/2019 |
| WO | WO 2007/126910 | 11/2007 |
| WO | WO 2018/119153 | 6/2018 |
| WO | WO-2020241921 A1 * | 12/2020 |
| WO | WO-2021002512 A1 * | 1/2021 |

OTHER PUBLICATIONS

KR Notice of Patent Grant dated Jan. 11, 2021 issued in counterpart application No. 10-2020-0094609, 3 pages.
Korean Office Action dated Oct. 16, 2020 issued in counterpart application No. 10-2020-0094609, 9 pages.
International Search Report dated Nov. 27, 2020 issued in counterpart application No. PCT/KR2020/010353, 8 pages.
European Search Report dated Dec. 7, 2020 issued in counterpart application No. 20189606.5-1220, 9 pages.
U.S. Office Action dated Jun. 14, 2021 issued in counterpart U.S. Appl. No. 17/226,845, 59 pages.
U.S. Office Action dated May 14, 2021 issued in counterpart U.S. Appl. No. 16/985,674, 39 pages.
U.S. Notice of Allowance dated Aug. 30, 2021 issued in counterpart U.S. Appl. No. 16/985,674, 11 pages.
Indian Examination Report dated Sep. 15, 2021 issued in counterpart application No. 202044033516, 6 pages.
U.S. Final Office Action dated Sep. 21, 2021 issued in counterpart U.S. Appl. No. 17/226,845, 37 pages.
AU Notice of Acceptance dated Dec. 1, 2021 Issued in counterpart application No. 2020213328, 3 pages.
European Search Report dated Mar. 14, 2022 issued in counterpart application No. 21211314.6-1216, 10 pages.
U.S. Office Action dated Mar. 17, 2022 issued in counterpart U.S. Appl. No. 17/226,845, 38 pages.
European Search Report dated Sep. 23, 2022 issued in counterpart application No. 21211314.6-1206, 7 pages.
U.S. Office Action dated Jul. 25, 2022 issued in counterpart U.S. Appl. No. 17/226,845, 39 pages.
U.S. Final Office Action dated Nov. 4, 2022 issued in counterpart U.S. Appl. No. 17/226,845, 49 pages.
Indian Examination Report dated Jan. 16, 2023 issued in counterpart application No. 202245001288, 5 pages.

(56) References Cited

OTHER PUBLICATIONS

U.S. Office Action dated Mar. 30, 2023 issued in counterpart U.S. Appl. No. 17/226,845, 60 pages.
Australian Examination Report dated Feb. 28, 2023 issued in counterpart application No. 2022201798, 3 pages.
European Search Report dated Mar. 27, 2023 issued in counterpart application No. 21211314.6-1206, 7 pages.
U.S. Office Action dated Jul. 13, 2023 issued in counterpart U.S. Appl. No. 17/226,845, 40 pages.
Chinese Office Action dated Jul. 10, 2023 issued in counterpart application No. 202010779363.5, 22 pages.
Australian Examination Report Report dated Aug. 10, 2023 issued in counterpart application No. 2022201798, 3 pages.
European Search Report dated Sep. 19, 2023 issued in counterpart application No. 21211314.6-1206, 8 pages.
Chinese Office Action dated Mar. 12, 2024 issued in counterpart application No. 202010779363.5, 31 pages.
U.S. Office Action dated Mar. 14, 2024 issued in counterpart U.S. Appl. No. 17/226,845, 43 pages.
European Search Report dated Feb. 29, 2024 issued in counterpart application No. 21211314.6-1206, 8 pages.
Australian Examination Report dated Jan. 13, 2025 issued in counterpart application No. 2023270330, 3 pages.
U.S. Final Office Action dated Oct. 10, 2024 issued in counterpart U.S. Appl. No. 17/226,845, 42 pages.
AU Notice of Acceptance dated Aug. 21, 2025 issued in counterpart application No. 2023270330, 3 pages.

* cited by examiner

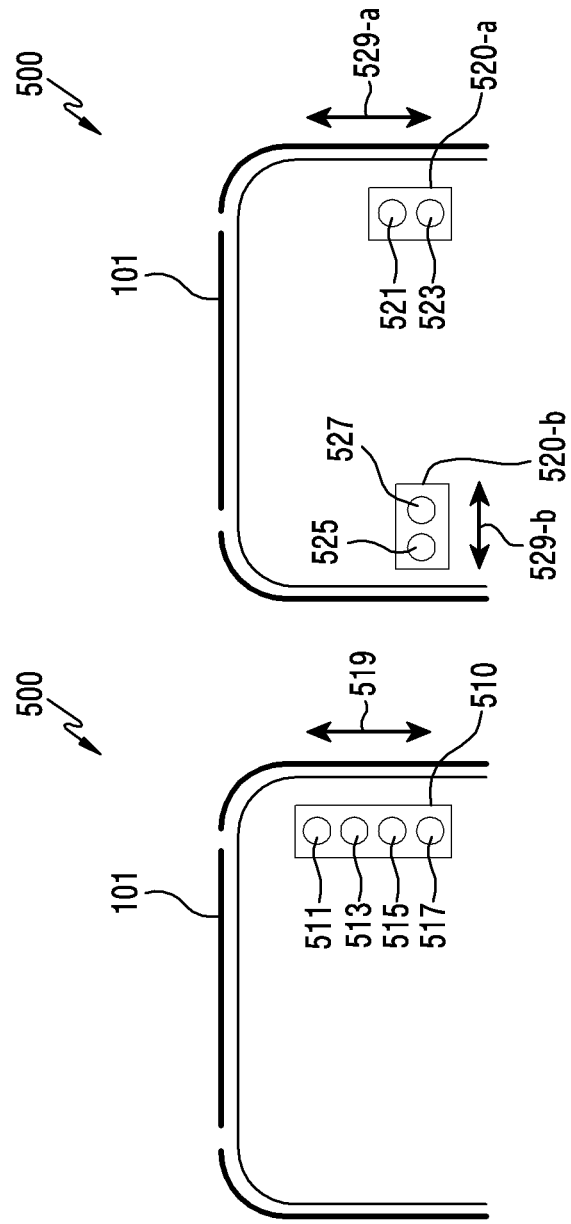

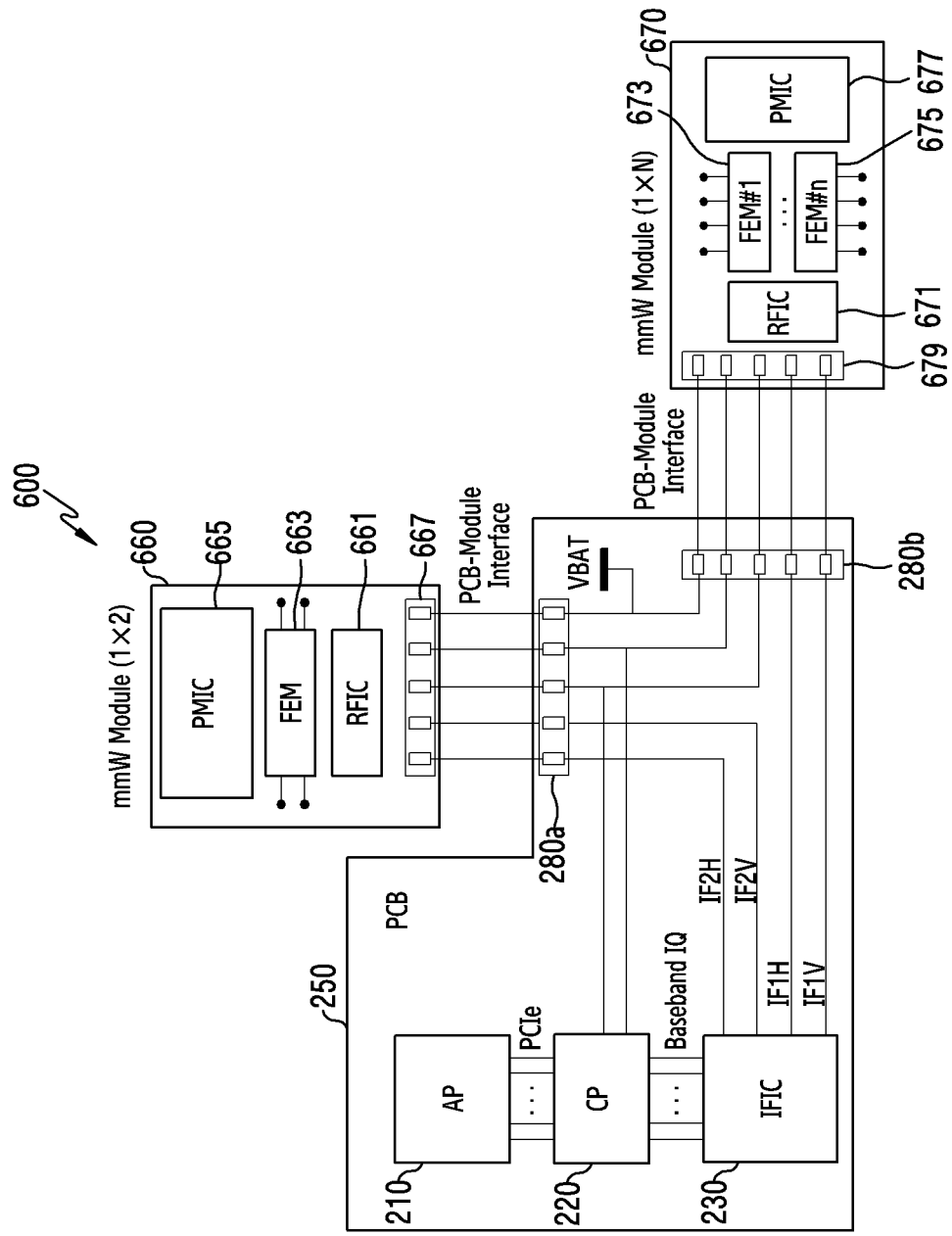

ANTENNA MODULE AND ELECTRONIC DEVICE FOR USING THE ANTENNA MODULE

CROSS-REFERENCE TO RELATED APPLICATION(S)

This application is a Continuation of U.S. patent application Ser. No. 16/985,674, filed on Aug. 5, 2020, in the U.S. Patent and Trademark Office, and claims priority under 35 U.S.C. § 119 to Korean Patent Application No. 10-2019-0094745, filed on Aug. 5, 2019, in the Korean Intellectual Property Office, and Korean Patent Application No. 10-2020-0094609, filed on Jul. 29, 2020, in the Korean Intellectual Property Office, the entire disclosure of each of which is incorporated herein by reference.

BACKGROUND

1. Field

The disclosure relates generally to an antenna module supporting a high frequency band, and an electronic device for using the antenna module.

2. Description of Related Art

A fifth generation (5G) communication system can be implemented in a high frequency band (e.g., millimeter wave (mmWave) band) to achieve a high data transfer rate. In particular, beamforming technology, massive multi-input multi-output (MIMO) technology, full dimensional MIMO (FD-MIMO) technology, array antenna technology, analog beam-forming technology, and large scan antenna technology have been discussed for the 5G communication system in order to reduce a path loss of radio waves and increase the transmission distance in high frequency bands.

Further, communication manners using mmWave bands, such as 802.11ay and 802.11ad have been defined. The characteristics of mm Wave bands are different from those of frequency bands within 6 gigahertz (GHz), so a front end structure for supporting mmWave frequency bands have been developed.

As more functions are increasingly required for electronic devices and mm Wave frequency bands are used, it is difficult to secure a space where an antenna module, which generates and radiates radio frequency (RF) signals in mm Wave frequency bands through an array antenna, may fit into limited spaces of electronic devices.

SUMMARY

The disclosure has been made to address the above-mentioned problems and disadvantages, and to provide at least the advantages described below. According to an aspect of the disclosure, a mobile communication device includes a processor positioned on a first printed circuit board, a radio frequency integrated circuit (RFIC), and an antenna module. The antenna module includes a second printed circuit board, a first antenna and a second antenna positioned on the second printed circuit board, and a plurality of front-end chips positioned on the second printed circuit board. The plurality of front-end chips include a first front-end chip electrically connecting the RFIC and the first antenna, and a second front-end chip electrically connecting the RFIC and the second antenna.

According to an aspect of the disclosure, provided is a portable communication device that includes a first printed circuit board (PCB) including a communication processor, an intermediate frequency integrated circuit (IFIC), and a radio frequency integrated circuit (RFIC) supporting a mm Wave communication; a first antenna module including a first 1×2 antenna array and a second 1×2 antenna array disposed at a second PCB, wherein the second PCB is electrically connected with the first PCB such that a first RF signal from the RFIC of the first PCB is transmitted to the first 1×2 antenna array and a second RF signal from the RFIC of the first PCB is transmitted to the second 1×2 antenna array; and a second antenna module including a first 1×4 antenna array and a second 1×4 antenna array disposed at a third PCB, wherein the third PCB is electrically connected with the first PCB such that a third RF signal from the RFIC of the first PCB is transmitted to the first 1×4 antenna array and a fourth RF signal from the RFIC of the first PCB is transmitted to the second 1×4 antenna array, and wherein both of the first antenna module and the second antenna module are located within 2 cm from the RFIC.

According to a further aspect of the disclosure, provided is a portable communication device comprising that includes a first PCB including an RFIC supporting a mmWave communication; a first antenna module including a first 1×2 antenna array and a second 1×2 antenna array disposed at a second PCB, wherein the second PCB is electrically connected with the first PCB such that a first radio frequency signal from the RFIC of the first PCB is transmitted to the first 1×2 antenna array and a second radio frequency signal from the RFIC of the first PCB is transmitted to the second 1×2 antenna array; and a second antenna module including a first 1×4 antenna array and a second 1×4 antenna array disposed at a third PCB, wherein the third PCB is electrically connected with the first PCB such that a third radio frequency signal from the RFIC of the first PCB is transmitted to the first 1×4 antenna array and a fourth radio frequency signal from the RFIC of the first PCB is transmitted to the second 1×4 antenna array, with both of the first antenna module and the second antenna module being located within 2 cm from the RFIC, and with a communication processor and an intermediate frequency integrated circuit (IFIC) being disposed at the same first PCB as the RFIC

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5A illustrates an antenna array is disposed in an electronic device, according to an embodiment;

FIG. 5B illustrates an antenna array is disposed in an electronic device, according to an embodiment;

FIG. 6 illustrates a transmission/reception structure using an antenna module in an electronic device, according to an embodiment;

DETAILED DESCRIPTION

Figure 1:
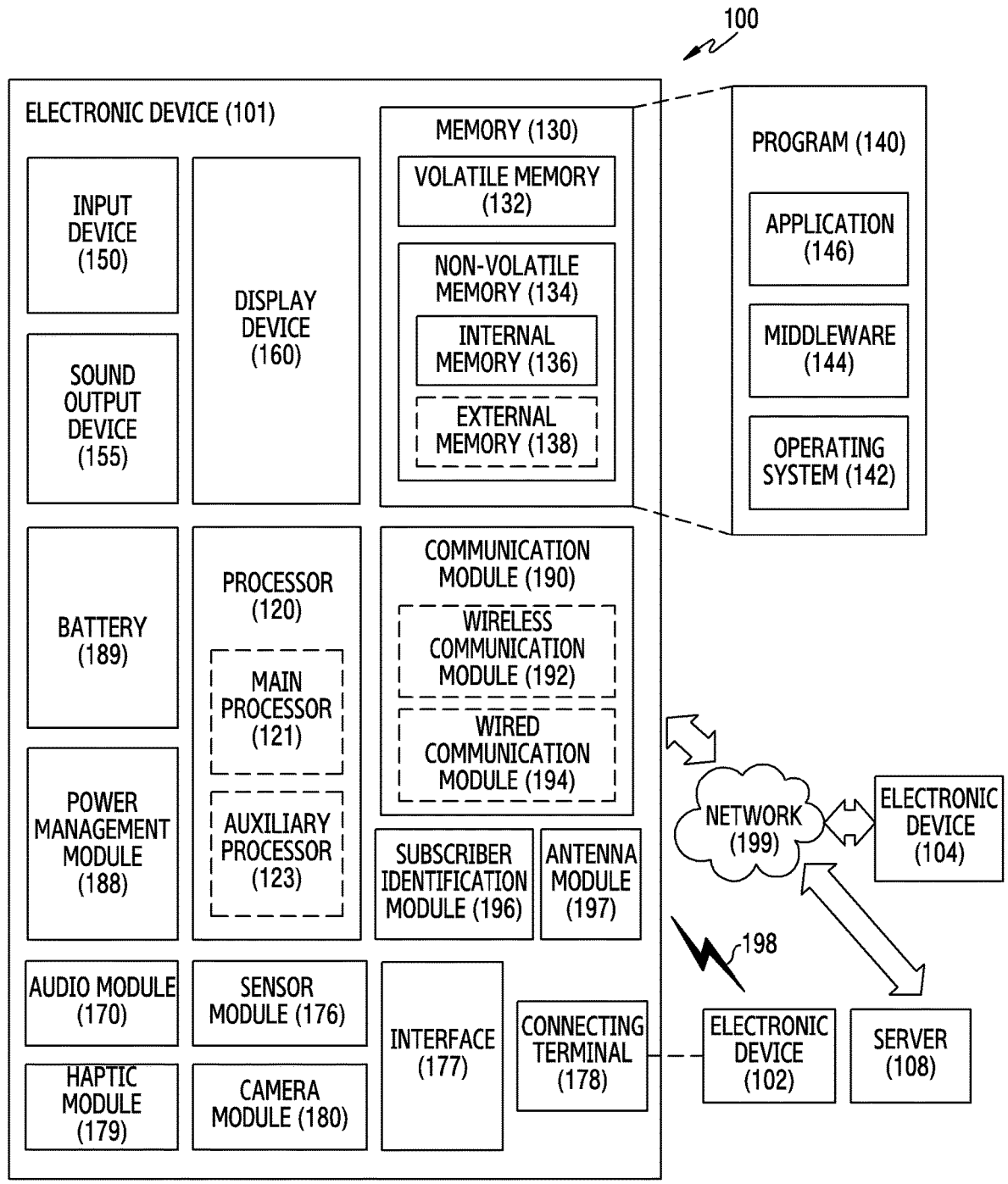
FIG. 1 illustrates an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 illustrates an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISP, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
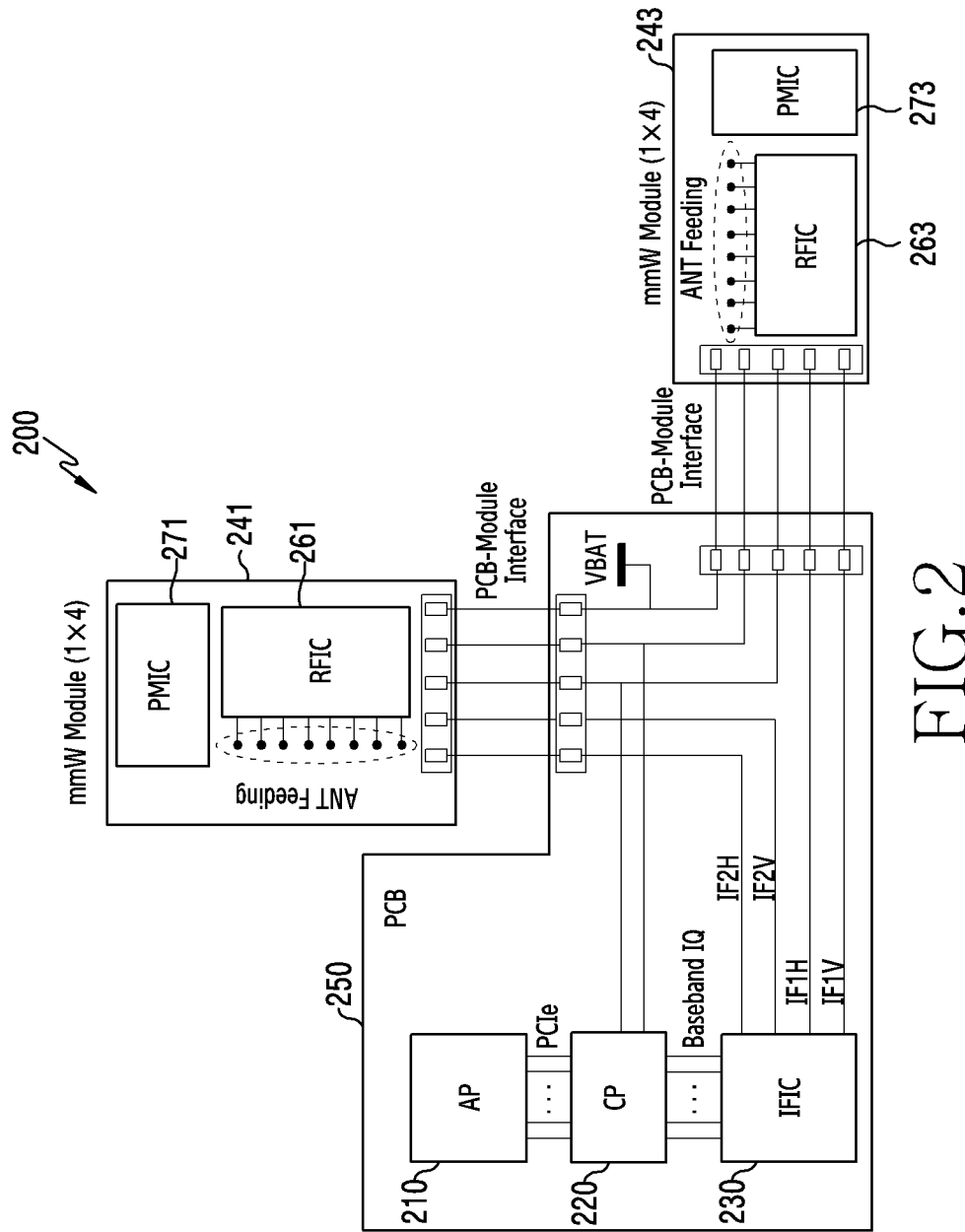
FIG. 2 illustrates a transmission/reception structure using an antenna, according to an embodiment.

FIG. 2 illustrates a transmission/reception (i.e., transmission or reception) structure using an antenna module in an electronic device, according to an embodiment.

Referring to FIG. 2, an electronic device 200 may be an electronic device that transmits or receives signals in a high frequency hand (mmWave frequency band). The electronic device 200 may have a structure that primarily converts a baseband (BB) signal up into an intermediate frequency (IF) signal and secondarily converts the up-converted IF signal up into an RF signal. As described above, the structure converting a BB signal into an RF signal through an IF signal, for example, may be a structure according to a sliding-IF type.

An electronic device that supports a mmWave band may have a structure that is different from those of electronic devices that supports frequency bands of 6 GHz, or 6 GHz or less. This is because the transmission/reception structures of an electronic device may depend on the supportable frequency bands. For example, it is preferable to employ a sliding-IF type in an electronic device that supports a mm Wave band, but it may be preferable to employ a zero-IF type in an electronic device that supports a frequency band of a 6 GHz, or 6 GHz or less. An electronic device employing the zero-IF type may have a structure that converts a BB signal directly up into an RF signal.

It may be difficult to employ a zero-IF structure in an electronic device that supports a high frequency (20 GHz or more), like a mm Wave band, because when a frequency is high (20 GHz or more), like a mm Wave band, a zero-if structure may have difficulty in generating a local oscillator (LO) signal to be supplied to an IQ mixer; or when a signal at a high frequency such as a signal in a mm Wave band is transmitted through a transmission line on a flame retardant 4 (FR4) PCB, very severe attenuation may be caused. In order to reduce attenuation on the transmission line, it may be possible to use a PCB that is less (e.g., less than 0.002) in dielectric loss than the FR4 PCB, but it may not be practical due to a high price, etc.

Accordingly, not the zero-IF type, but the sliding-IF type can be employed in an electronic device that supports a high frequency band.

When the sliding-IF type is employed in an electronic device, for example, in order to reduce attenuation on a transmission line, a configuration (e.g., a CP) that generates a BB signal and a configuration that primarily converts the BB signal up into an IF signal and then secondarily converts the IF signal up into an RF signal may be independently disposed on a PCB. That is, the configuration (e.g., a CP) that generates a BB signal may be disposed on a first PCB and the configuration (e.g., a mixer) that converts the BB signal up into an RF signal may be disposed on a second PCB. In this case, signal attenuation due to a high frequency may restrictively occur only on the transmission line in the second PCB, but the size of the second PCB may be increased.

When the sliding-IF type is employed in an electronic device, a configuration (e.g., a CP) that generates a BB signal and a configuration (e.g., an intermediate frequency integrated circuit (IFIC) that converts the BB signal up into an IF signal may be disposed on a first PCB, and a configuration (e.g., an RFIC) that converts the IF signal up into an RF signal may be disposed on a second PCB. Accordingly, a signal at a relatively low frequency (e.g., in a 9 GHz band) can be transmitted in the first PCB and a signal at a relatively high frequency (e.g., 20 GHz or more band) such as a signal in a mmWave band can be transmitted in the second PCB. Accordingly, it is possible to prevent an excessive increase in size of the second PCB on which an antenna module including the configuration (e.g., an RFIC) that converts an IF signal up into an RF signal will be disposed. In order to decrease signal attenuation due to a high frequency, a PCB having a small dielectric loss (e.g., less than 0.002) may be used as the second PCB.

In detail, an IFIC 230 may be mounted on a PCB 250 as a configuration that converts a BB signal up into an IF signal, and a first RFIC 261 or a second RFIC 263 may be mounted on a first antenna module 241 or a second antenna module 243 as a configuration that converts an IF signal up into an RF signal. The first antenna module 241 or the second antenna module 243 may be included in the PCB. The first RFIC 261 or the second RFIC 263 may be positioned or disposed on one side of the PCB including the first antenna module 241 or the second antenna module 243. Antenna elements may be positioned or disposed on the opposite side to the side on which the first RFIC 261 or the second RFIC 263 is positioned or disposed. The first RFIC 261 or the second RFIC 263 can transmit or receive a mm Wave signal through the antenna elements.

At least one processor or IFIC 230 may be positioned on the PCB 250. The at least one processor may be at least one of an AP 210 or a CP. The AP 120 on the PCB 250 can process and calculate various data, whereby it is possible to control at least one other configuration (e.g., the CP 220) of an electronic device 101. The CP 220 on the PCB 250 can generate a BB signal and transmit the generated BB signal to the IFIC 230 for direct communication or wireless communication. The IFIC 230 on the PCB 250 can convert the BB signal transmitted from the CP 220 up into an IF signal and transmit the IF signal to an antenna module 243 through a PCB-module interface, or can convert an IF signal transmitted from the antenna module 243 through the PCB-module interface down into a BB signal and transmit the BB signal to the CP 220.

A first power management integrated circuit (PMIC) 271 or a second PMIC 273 may be positioned on the PCB included in the first antenna module 241 or the second antenna module 243. The first PMIC 271 or the second PMIC 273 can generate power for driving the first RFIC 261 or the second RFIC 263. When the first PMIC 271 or the second PMIC 273 is positioned on the PCB included in the first antenna module 241 or the second antenna module 243, it is possible to reduce the number of pins according to a PCB-module between the PCB 250 and the first antenna module 241 or the second antenna module 243. In particular, it is possible to reduce a power drop due to a power line connecting the PCB 250 to the first antenna module 241 or the second antenna module 243.

The PCB 250 may be connected with the first antenna module 241 or the second antenna module 243 using a flexible PCB (FPCB), a flexible RF cable (FRC), or an interposer to exchange signals and/or supply power. The FRC, for example, may be defined as a cable that has flexibility not to break even if it is folded or bent and that has impedance matched for transmitting an RF signal.

When the first antenna module 241 or the second antenna module 243 is mounted in an electronic device, the first antenna module 241 or the second antenna module 243 may be horizontally mounted on the PCB 250. In this case, the physical space occupied by the first antenna module 241 or the second antenna module 243 in the electronic device may be large. This is because a first RFIC 261 or a second RFIC 263 including a front end circuit (e.g., a power amplifier (PA), a low noise amplifier (LNA), and a phase shifter may be positioned on one chip by applying a complementary metal oxide semiconductor (CMOS) process to the first antenna module 241 or the second antenna module 243.

It is possible to separate the front end circuit from the first RFIC 261 or the second RFIC 263 included in the first antenna module 241 or the second antenna module 243 in order to decrease the size of the first antenna module 241 or the second antenna module 243. An FEM including the front end circuit may be implemented as one chip using a compound (e.g., silicon germanium (SiGe) or gallium arsenide (GaAS)) process. In the FEM implemented using a compound process, the maximum output that can be obtained from one AP can be increased by about 6 decibel (dB) in comparison to the case that uses the CMOS process. It is also possible to reduce the number of antenna elements for achieving the same performance.

A mm Wave array antenna structure having a 1×4 configuration can obtain a gain of 12 dB by generating reinforcement interference in a desired beam direction using an array antenna and an array transmission chain structure. In this case, it is possible to overcome the limit (e.g., 11 dB) of output power due to one mmWave CMOS PA.

When a separate structure in which an FEM is implemented using a compound (SiGe or GaAS) process, it is possible to increase the maximum output that can be obtained from one PA by 6 dB in comparison to a PA implemented by using a CMOS process and it is possible to reduce a half of the antenna elements included in an array antenna required to obtain the same performance.

Figure 3:
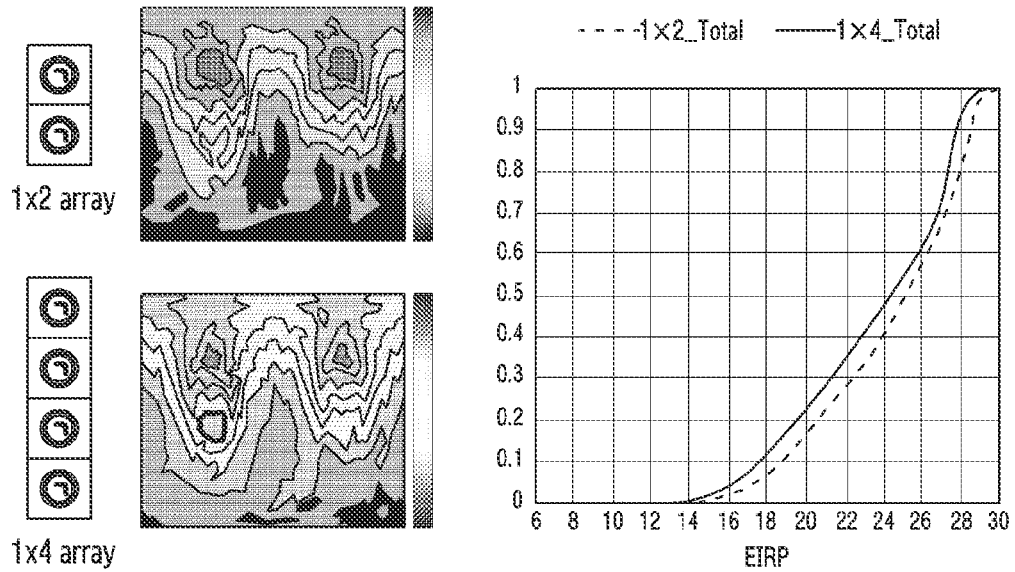
FIG. 3 illustrates improved performance of an antenna module, according to an embodiment.

FIG. 3 illustrates improved performance of an antenna module, according to an embodiment.

Equivalent isotropic radiated power (EIRP) and spherical coverages of a 1×4 array antenna module (hereafter, referred to as an "existing antenna module") using a CMOS process and a 1×2 array antenna module (hereafter, referred to as an "improved antenna module") using a compound process are compared in FIG. 3. The existing antenna module may have a structure in which a front end circuit is included in an RFIC, and the improved antenna module may have a structure in which a front end circuit is separated from an RFIC and included in an FEM. As a result, it can be seen that the EIRP and spherical coverage of the improved antenna module are improved in terms of performance in comparison to the existing antenna module. For example, the EIRP of the existing antenna module is 29.4 at a point where a cumulative distribution function (CDF) is maximum, but the EIRP of the improved antenna module is improved as 30.1. Further, the EIRP of the existing antenna module is 24.4 at the point where the CDF is 50, the EIRP of the improved antenna module is improved as 25.1. Additionally, it may be possible to further decrease the size of the antenna module when implementing an antenna module in which an RFIC and an FEM are separated, using other processes.

Figure 4A:
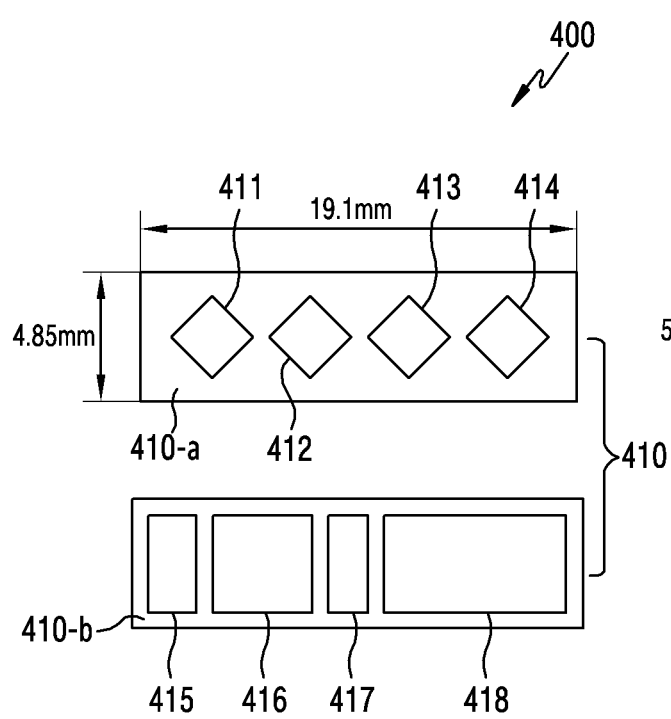
FIG. 4A illustrates an antenna module included in an electronic device, according to an embodiment.
Figure 4B:
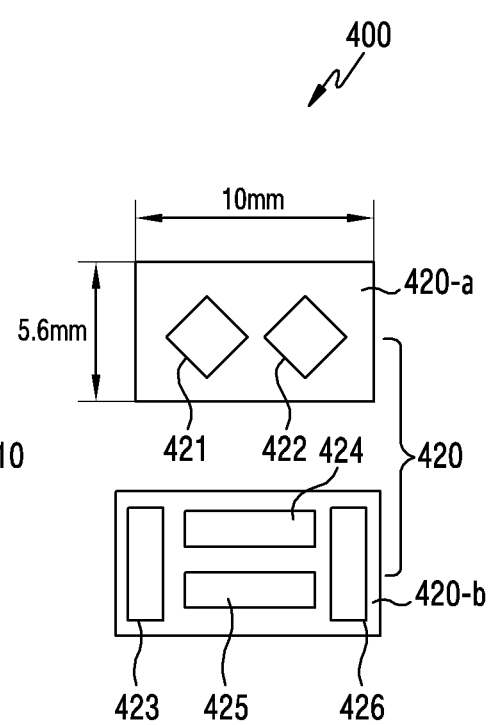
FIG. 4B illustrates an antenna module included in an electronic device, according to an embodiment.

FIGS. 4A and 4B illustrate an antenna module included in an electronic device 101, according to various embodiments.

Specifically, FIG. 4A illustrates an example of the structure of an existing antenna module using a CMOS process and FIG. 4B illustrates an example of an improved antenna module using a compound process. The existing antenna module having a structure in which a front end circuit is included in an RFIC shown in FIG. 4A includes a 1×4 antenna array, and the antenna module having a structure in which a front end circuit is separated from an RFIC shown in FIG. 4B includes a 1×2 antenna array.

The size of the existing antenna module may be determined by a width of 19.1 mm and a length of 4.85 mm, and the size of the improved antenna module may be determined by a width of 10 mm and a length of 5.6 mm.

FIG. 4A illustrates an example in which four antenna elements (first antenna element 411, second antenna 412, third antenna 413, and fourth antenna 414) are positioned on a PCB included in an antenna module.

Referring to FIG. 4A, the PCB 410 may have two surfaces (e.g., a front surface and a rear surface). The first antenna element 411, the second antenna 412, the third antenna 413, and the fourth antenna 414 may be positioned on one surface 410-a (e.g., the front surface) of the PCB 410, and an FPCB connector 415, a PMIC 416, a passive element 417, and an RFIC 418 may be positioned on the other surface 410-b (the opposite surface to the surface 410-a) (e.g., the rear surface) of the PCB 410. Referring to FIG. 4A, at least one antenna element of the first antenna element 411, the second antenna 412, the third antenna 413, and the fourth antenna 414 may be used to transmit and receive a wireless signal, and another at least one antenna element may be used to receive a wireless signal.

FIG. 4B illustrates an example in which two antenna elements (first antenna 421 and second antenna 422) are positioned on a PCB 420 included in an antenna module.

Referring to FIG. 4B, the PCB 420 according to an embodiment may have two surfaces (e.g., a front surface and a rear surface). The first antenna 421 and the second antenna 422 may be positioned on one surface 420-a (e.g., the front surface) of the PCB 420, and at least one FEM (e.g., a first FEM 424 and/or a second FEM 425) may be positioned on the other surface 420-b (the opposite surface to the surface 410-a) (e.g., the rear surface) of the PCB 420. In FIG. 4B, an RFIC 423 and a PMIC 426 may be further positioned on the other surface 420-b of the PCB 420. The one or plurality of FEMs 424 and 425, for example, may be front end chips. The RFIC 423, for example, may be electrically connected to at least one of the first FEM 424 and/or the second FEM 425. Referring to FIG. 4B, at least one antenna element (e.g., the first antenna element 421) of the first antenna element 421 and the second antenna element 422 may be used to transmit and receive a wireless signal, and the other one antenna element (e.g., the second antenna element 422) may be used to receive a wireless signal.

When one FEM (e.g., one of the first FEM 424 or the second FEM 425) is be positioned on the other surface 420-b of the PCB 420, the one FEM may be electrically connected to the first antenna element 421 and the second antenna element 422. The one FEM, for example, may be electrically connected to the first antenna element 421 and the second antenna element 422 through a via hole.

When the first and second FEMs 424 and 425 are positioned on the other surface 420-b of the PCB 420, the first FEM 424 may be electrically connected to the first antenna element 421 and the second FEM 425 may be electrically connected to the second antenna element 422. The first FEM 424, for example, may be electrically connected to the first antenna element 421 through a via hole. The second FEM 425, for example, may be electrically connected to the second antenna element 422 through a via hole.

When the PCBs have a multilayer structure, at least two antenna elements may be positioned on the top of the upper plate of the PCBs having the multilayer structure, and at least two front end chips may be positioned on the top of the lower plate of the PCBs having the multilayer structure.

A passive element may be positioned on the PCB 420 included in the antenna module, but may not be limited thereto. The passive element, for example, may be disposed on a PCB 250 on which an IFIC is positioned.

Although an RFIC 423 and/or a PMIC 426 may be disposed on the other surface 420-b of the PCB 420, they may be disposed on a PCB 250 on which an IFIC is positioned.

FIGS. 5A-5B illustrate an antenna array disposed in an electronic device 101, according to various embodiments.

FIG. 5A illustrates an example in which an antenna module 510 including a 1×4 array antenna is disposed in an electronic device 500. For example, four antenna elements 511, 513, 515, and 517 constituting one antenna array may be disposed in a line in an up-down direction 519 (the direction indicated by arrows) at the right side on the rear surface of an electronic device. When, four antenna elements 511, 513, 515, and 517 disposed in an up-down direction 519 constitute one antenna module 510, the electronic device 101 can control a beam direction only up and down.

FIG. 5B illustrates an example in which first antenna module 520-a and second antenna module 520-b, each including a 1×2 array antenna, are disposed in an electronic device 500. A first antenna module 520-a that is one of the two antenna modules 520-a and 520-b may include first and second antenna elements 521 and 523 constituting a first antenna array. A second antenna module 520-b that is the other one of the two antenna modules 520-a and 520-b may include third and fourth antenna elements 525 and 527 constituting a second antenna array.

FIG. 5B illustrates an example in which two antenna arrays 520-a and 520-b each including a 1×2 array antenna are disposed in an electronic device. The two antenna arrays 520-a and 520-b may be positioned in one antenna module. Accordingly, the antenna module may include first to fourth antenna elements 521, 523, 525, and 527 constituting the two antenna arrays 520-a and 520-b. The first and second antenna elements 521 and 523 constitute a first antenna array 520-a, and the third and fourth antenna elements 525 and 527 constitute a second antenna array 520-b.

The first and second antenna elements 521 and 523 in the first antenna module 520-a may be disposed in a line in an up-down direction 529-a (direction indicated by arrows) at the right side on the rear surface of the electronic device, and the third and fourth antenna elements 525 and 527 in the second antenna module 520-b may be disposed in a line in a left-right direction 529-b (direction indicated by arrows) at the left side on the rear surface of the electronic device. When there are two separate antenna arrays (i.e., first antenna module 520-a and second antenna module 520-b) and the separate two antenna arrays are disposed in different directions, the electronic device 101 can control the beam direction up and down and/or left and right.

Accordingly, it is possible to more freely dispose antenna modules reduced in size by separating an FEM from an RFIC. For example, it is possible to dispose antenna modules, as shown in FIG. 5B, so it may be possible to expand an area in which a communication service is possible.

FIG. 6 illustrates a transmission/reception structure using an antenna module in an electronic device 600, according to an embodiment.

Referring to FIG. 6, an electronic device 600 includes a PMIC 665, a PCB 250 having an AP 210, a CP 220, and an IFIC 230 disposed thereon and with connections to interface 280a and interface 280b, a first antenna module 660 and/or a second antenna module 670.

The electronic device 600, for example, may include one or both of a first antenna module 660 or a second antenna module 670. The first antenna module 660 and the second antenna module 670 have a structure in which an RFIC and an FEM are separated.

The first antenna module 660 may include a first PCB. A first RFIC 661 and an FEM 663 may be separately positioned on the first PCB included in the first antenna module 660. The first RFIC 661, for example, may be formed through a CMOS process. The FEM 663, for example, may be made of a compound process. In this case, the first RFIC 661 may include a first semiconductor made of a first material and the FEM 663 may include a second semiconductor made of a second material different from the first material.

The first antenna module 660 may include one or a plurality of 1×2 array antennas. The first antenna module 660 may further include a first interface 667 for signal connection with the PCB 250. The first interface 667, for example, may be configured using one of a FPCB connector, an FRC connector, or an interposer.

The second antenna module 670 may include a second PCB. A second PMIC 677 and a plurality of FEMs (e.g., an FEM #1 673 to an FEM #n 675) may be separately positioned on the second PCB included in the second antenna module 670. The second RFIC 671, for example, may be formed through a CMOS process. The FEM #1 673 to an FEM #n 675, for example, may be made of a compound process. In this case, the second RFIC 671 may include a first semiconductor made of a first material and the FEM #1 673 to an FEM #n 675 may include a second semiconductor made of a second material different from the first material.

The second antenna module 670 may include N antenna elements. The N antenna elements may form a plurality of array antennas. The second antenna module 670, for example, may form two array antennas using N antenna elements. In this case, one array antenna may be electrically connected with the FEM #1 673 and the other array antenna may be electrically connected with the FEM #n 675. The second antenna module 670 may further include a second interface 679 for signal connection with the PCB 250. The second interface 679, for example, may be configured using one of a FPCB connector, an FRC connector, or an interposer.

The FEM 663 positioned in the first antenna module 660 may have the same structure as the FEM #1 673 to the FEM #n 675 positioned in the second antenna module 670. The FEM 663 positioned in the first antenna module 660 and the FEM #1 673 to the FEM #n 675 positioned in the second antenna module 670 may be front end chips.

The first front end chip positioned in the second antenna module 670 may include first and second transmission/reception chains, and the second front end chip positioned in the second antenna module 670 may include third and fourth transmission/reception chains. For example, the first transmission/reception chain can electrically connect the RFIC 671 and the first antenna element, the second transmission/reception chain can electrically connect the RFIC 671 and the third antenna array, the third transmission/reception chain can electrically connect the RFIC 671 and the second antenna element, and the fourth transmission/reception chain can electrically connect the RFIC 671 and the fourth antenna element. The first antenna element and the third antenna element, for example, may be configured to operate as a first antenna array for a wireless signal that will be transmitted by the RFIC 671 or a wireless signal that will be received by the RFIC 671. The second antenna element and the fourth antenna element, for example, may be configured to operate as a second antenna array for a wireless signal that will be transmitted by the RFIC 671 or a wireless signal that will be received by the RFIC 671.

The first and third antenna elements configured to operate as a first antenna array may be positioned perpendicular to the second and fourth antenna elements configured to operate as a second antenna array on the PCB included in the antenna module.

The CP 220 positioned on the PCB 250 may be configured to form a first beam using a first front-end chip (e.g., the FEM #1 673) and the first antenna array positioned in the second antenna module 670 and may be configured to form a second beam using a second front-end chip (e.g., the FEM #n 675) and the second antenna array. The CP 220 may be configured to perform an operation of forming the first beam and an operation of forming the second beam, for example, such that the first beam and the second beam have the same frequency. The first beam may be formed, for example, to travel to a first surface of the electronic device and the second beam may be formed, for example, to travel to a second surface different from the first surface.

The antenna elements electrically connected to the FEM 673 positioned in the second antenna module 670 may be disposed to face different surfaces of the electronic device, and the antenna elements electrically connected to the FEM #1 673 to the FEM #n 675 positioned in the second antenna module 670 may be disposed to face different surfaces of the electronic device. The FEM 673 positioned in the second antenna modulo 670, and the FEM #1 673 to the FEM #n 675 positioned in the second antenna module 670 may be disposed to face the opposite surface to the surface that the antenna elements face.

The PCB included in the second antenna module 670 may have a first rigid PCB portion, a second rigid PCB portion, and a flexible PCB connecting the first rigid PCB portion and the second rigid PCB portion. For example, the FEM #1 673 included in the second antenna module 670, and one or a plurality of antenna elements electrically coupled to the FEM #1 673 may be positioned on the first rigid PCB portion. For example, the FEM #n 675 included in the second antenna module 670, and one or a plurality of antenna elements electrically coupled to the FEM #n 675 may be positioned on the second rigid PCB portion.

Figure 7:
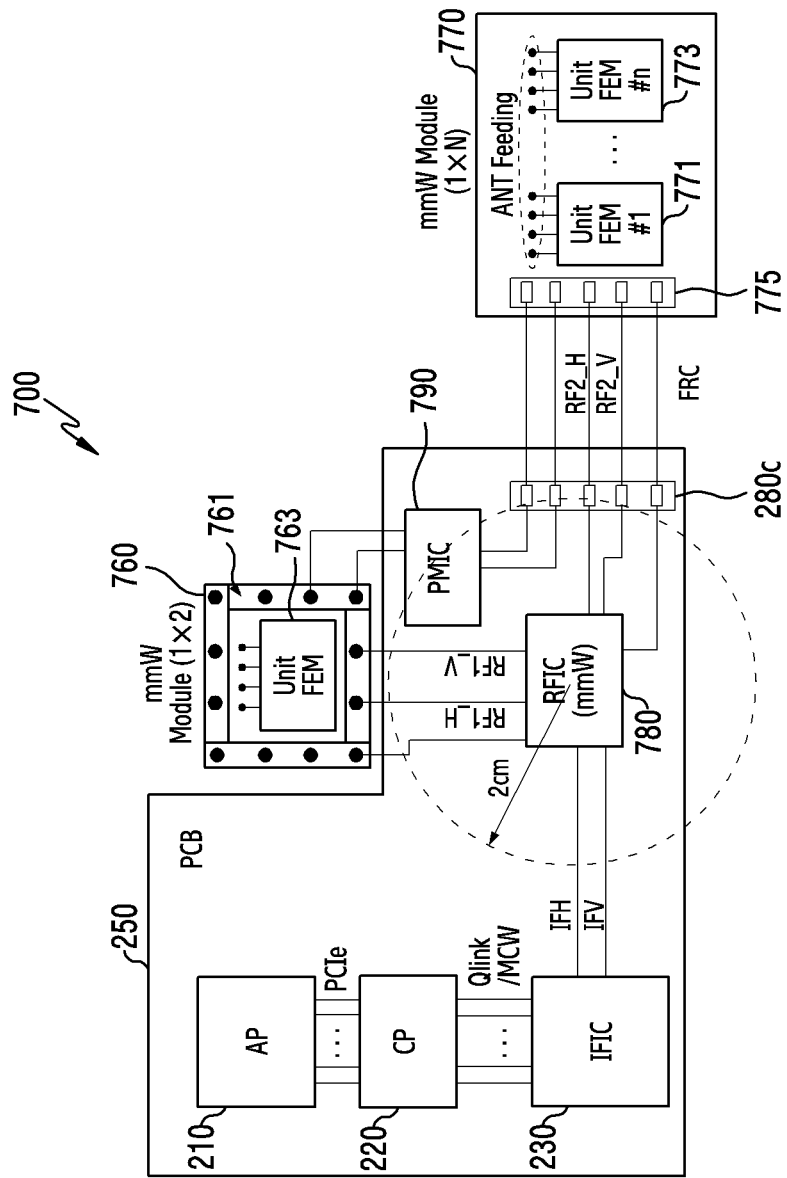
FIG. 7 illustrates a transmission/reception structure using an antenna module in an electronic device, according to an embodiment.

FIG. 7 illustrates a transmission/reception structure using an antenna module in an electronic device 700, according to an embodiment.

Referring to FIG. 7, an electronic device 700 includes a PCB 250 having an AP 210, a CP 220, an IFIC 230, an RFIC 780 with connection to interface 280c, a PMIC 790, a first antenna module 760 and a second antenna module 770.

The first antenna module 760 may include a plurality of first antenna elements forming an array antenna, a first FEM 763, and/or a first interface 761. The first interface 761 may include at least one of an interposer or an FRC.

The second antenna module 770 may include a plurality of second antenna elements, FEM #1 771 to FEM #n 773, and/or a second interface 775. The second interface 775 may include at least one of an interposer or an FRC.

An RFIC 780 and/or a PMIC 790 may be positioned on the PCB 250. The RFIC 780 positioned on the PCB 250 can convert an IF signal up into an RF signal and can transmit the RF signal to all or some of a plurality of antenna elements disposed in a plurality of the first antenna module 760 and the second antenna module 770. The PMIC 790 positioned on the PCB 250 can supply power for driving the first antenna module 760 and the second antenna module 770.

One RFIC 780 and a PMIC 790 may be disposed on the PCB 250, instead of the RFIC and the PMIC positioned in the antenna module. This reduces the number of circuits and parts in the antenna module, thereby being able to secure extra space or reduce the size of the antenna module. Alternatively, by implementing the FEMs (i.e., unit FEM 763, or any of FEM #1 771 to FEM #n 773) using a compound semiconductor (GaAs or SiGe), it is possible to reduce the power that is consumed by a single PA in comparison to a PA using a CMOS process. Accordingly, it is possible to reduce the power current that is supplied to the first antenna module 760 and the second antenna module 770.

When the RFIC 780 is disposed on the PCB 250, a wireless signal in a high frequency band (e.g., a signal in a mm Wave band) generated by the RFIC 780 and can be transmitted to the first antenna module 760 and the second antenna module 770 through the PCB 250 having a large loss (e.g., a dielectric loss of about 0.02). In this case, in order to compensate for the loss due to signal attenuation, the PA or the LNA of a transmission and/or reception chain uses more power, so the power consumption may be increased. However, according to a test result, when the antenna module 760 and 770 are disposed within about 2 cm from the RFIC 780, the loss that a wireless signal in a high frequency band (e.g., a signal in a mmWave band) will experience may be about 10 dB. The loss of about 10 dB may be compensated, for example, through an FEM produced through a compound process having excellent gain and linear characteristic.

The first antenna module 760 and the second antenna module 770 receive two or more RF signals (e.g., RF1 and RF2) and transmit the RF signals to a plurality of antenna elements respectively corresponding to the RF signals, whereby a plurality of array antenna may be implemented in one antenna module.

Figure 8:
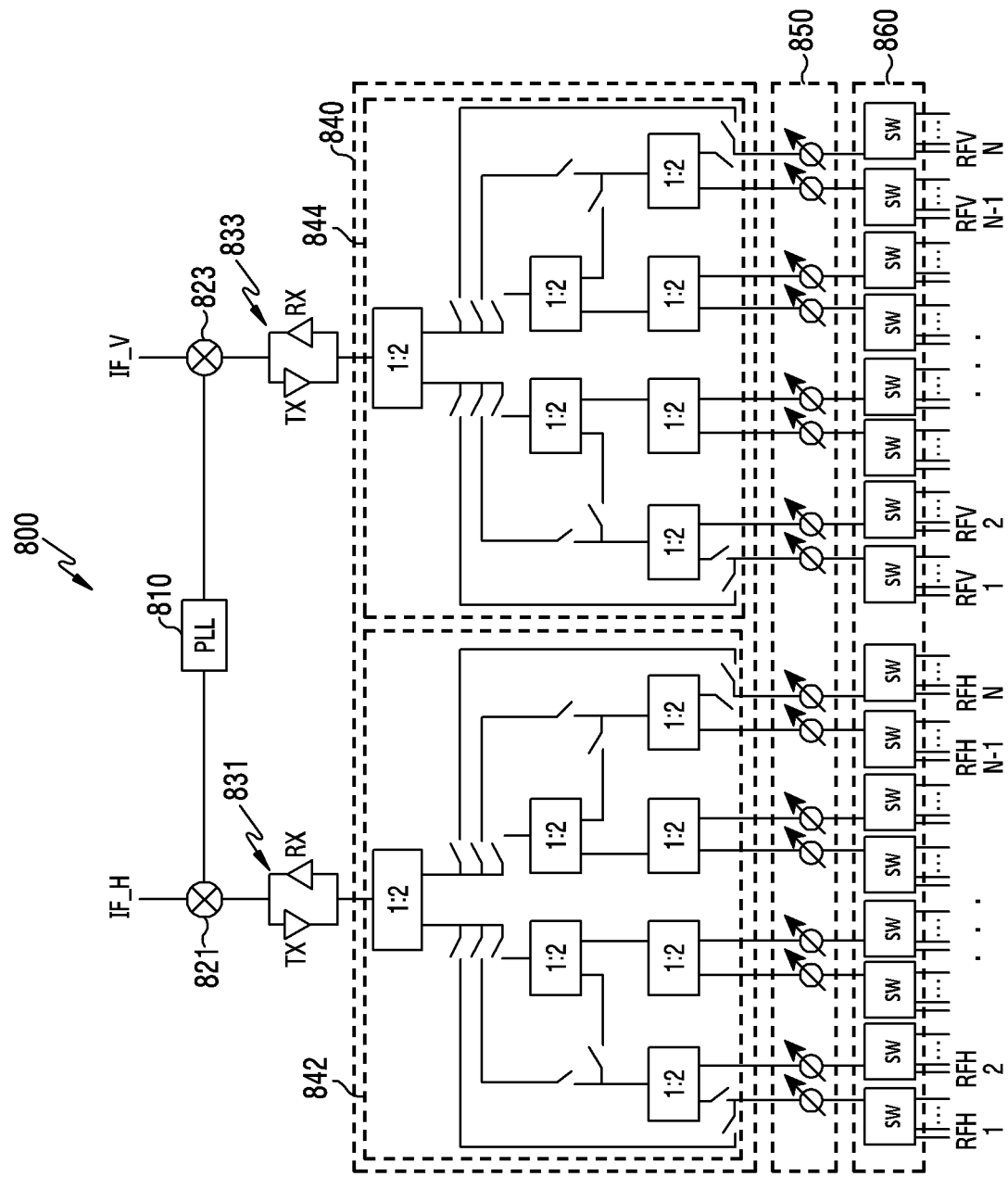
FIG. 8 illustrates an RFIC in an electronic device, according to an embodiment.

FIG. 8 illustrates an RFIC 800 in an electronic device, according to an embodiment.

Referring to FIG. 8, the RFIC 800 may be an RFIC for a mmWave frequency that is mounted on a PCB 250. The RFIC 800 may include an LO 810, a first mixer 821, a second mixer 823, a first buffer 831, a second buffer 833, a splitter-coupler 840, a phase shifter 850, and/or a switch module 860.

The LO 810 can generate a local oscillation frequency for converting an IF signal up into an RF signal and/or converting an RF signal down into an IF signal. The LO 810 may have the structure of a phase lock loop (PLL) circuit including a voltage controlled oscillator (VCO). The LO 810 can generate signals having a plurality of local oscillation frequencies for converting a plurality of IF signals having different characteristics up into RF signals. The plurality of IF signals having different characteristics, for example, may include an IF signal IF_H having horizontal polarization and an IF signal IF_V having vertical polarization. In this case, the LO 810 can generate a first local oscillation frequency for converting an IF_H up into an RF signal having horizontal polarization (RF horizontal (RFH)) and a second local oscillation frequency for converting an IF_V up into an RF signal having vertical polarization (RF vertical (RFV)).

The LO 810 can generate a plurality of local oscillation frequencies for converting a plurality of RF signals having different characteristics down into IF signals. The plurality of RF signals having different characteristics may include an RFH and an RFV. In this case, the LO 810 can generate a first local oscillation frequency for converging the RFH down into an IF_H and a second local oscillation frequency for converting the RFV down into an IF_V.

A first mixer 821 can convert and output an IF_H up into an RFH or convert and output an RFH down into an IF_H, using the first local oscillation frequency supplied from the LO 810.

A second mixer 823 can convert and output an IF_V up into an RFV or convert and output an RFV down into an IF_V, using the second local oscillation frequency supplied from the LO 810.

The splitter-coupler 840 can split an RF signal for transmission through antenna elements in consideration of the number of the antenna elements or can couple and output RF signals received from the antenna elements as at least one RF signal. The RF signal for transmission, for example, may be an RF signal generated by the first mixer 821 and/or the second mixer 823 and input through the first buffer 831 and the second buffer 833. The RF signals received from the antenna elements may be RF signals that are received by the antenna elements and then input with the phases shifted through the phase shifter 850.

When it is required to transmit an RF signal through antenna elements supporting N double polarization included in an antenna module 770, the splitter-coupler 840 can split an RF signal (RFH or RFV) input for transmission into 2N RF signals RFH 1, RFH 2, ..., and RFH N and/or RFV 1, RFV 2, ..., and RFV N. The RFH and the RFV may be transmitted to one antenna element and the radiated through the one antenna element. To this end, at least one processor (e.g., the AP 210 or the CP 220) can control switches included in the splitter-coupler 840 such that number of splitter-coupler components that the RF signals pass through.

The splitter-coupler 840 may include a first splitter-coupler circuit 842 and a second splitter-coupler circuit 844 that are independent for each RF signal type. A first splitter-coupler circuit 842 included in the splitter-coupler 840 can split an RFH that is an RF signal input through the first buffer 831 to N RFHs, including RFH 1, RFH 2, . . . , and RFH N, for N antenna elements or can couple N RF signals, including RFH 1, RFH 2, . . . , and RFH N, received through the N antenna elements into one RFH and output the RFH to the first buffer 831. A second splitter-coupler circuit 844 included in the splitter-coupler 840 can split an RFV that is an RF signal input through the second buffer 833 to N RFVs, including RFV 1, RFV 2, . . . , and RFV N, for N antenna elements or can couple N RF signals including RFV 1, RFV 2, . . . , and RFV N, received through the N antenna elements into one RFV and output the RFV to the second buffer 833.

When it is required to transmit an RF signal through two antennas included in an antenna module 760, the splitter-coupler 840 can form a transmission path so that an RF signal input for transmission is output as two RF signals (e.g., RFH1 and RFH N).

The phase shifter 850 can shift the phases of RF signals to be transmitted by forming a beam for transmission or can shift the phases of RF signals received through a beam formed for reception. The switch module 860 can form a transmission path for transmitting an RF signal transmitted from the phase shifter 850 to an antenna module (e.g., the first antenna module 760 and the second antenna module 770) or can form a reception path for receiving a reception RF signal from the antenna module (e.g., the first antenna module 760 and the second antenna module 770).

The phase shifter 850 included in the RFIC 800 may be disposed in an FEM included in an antenna module.

When the RFIC 800 having the structure shown in FIG. 8 is mounted on a PCB, an FEM positioned in an antenna module may include a PA or an LNA. The FEM positioned in the antenna module may include a phase shifter 850. In this case, it is possible to reduce the parts and/or circuits mounted in the antenna module, and therefore decrease the size of the antenna module.

The RFIC 800 having the structure shown in FIG. 8 is mounted in an antenna module, an IF signal can be provided to the antenna module from a PCB. In this case, the IF signal provided by the PCB can be converted up into an RF signal by the RFIC 800 mounted in the antenna module and then the RF signal can be transmitted to an FEM positioned in the antenna module. The FEM may include a PA or an LNA. The FEM may include a phase shifter 850. In this case, it is possible to reduce the parts and/or circuits mounted in the antenna module, so it is possible to decrease the size of the antenna module.

Figure 9:
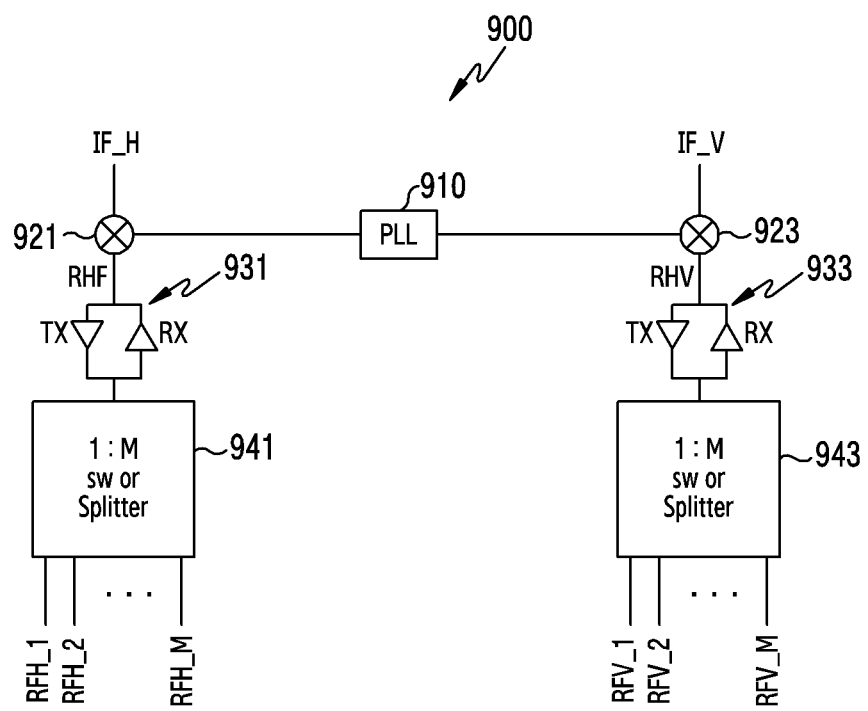
FIG. 9 illustrates an RFIC in an electronic device, according to an embodiment.

FIG. 9 illustrates an RFIC 900 in an electronic device, according to an embodiment.

Referring to FIG. 9, the RFIC 900 may be an RFIC for a mm Wave frequency that is mounted on a PCB. The RFIC 900 may have a structure having independent transmission/reception chains for respective polarization. The RFIC 900 may include a first transmission/reception circuit including a first mixer 921, a first buffer 931, and a first switch/splitter-coupler 941; and a second transmission/reception circuit including a second mixer 923, a second buffer 933, and a second switch/splitter-coupler 943. The first switch/splitter-coupler 941 and the second switch/splitter-coupler 943 included in the first transmission/reception circuit and the second transmission/reception circuit may include a splitter-coupler, a phase shifter, and/or a switch module.

The operation according to the structure for the RFIC 900 in FIG. 9 may be the same as the operation of the RFIC 800 having the structure shown in FIG. 8 except for the arrangement of the components. Accordingly, a detailed operation by the RFIC 900 shown in FIG. 9 is not described.

Figures 10A, 10B:
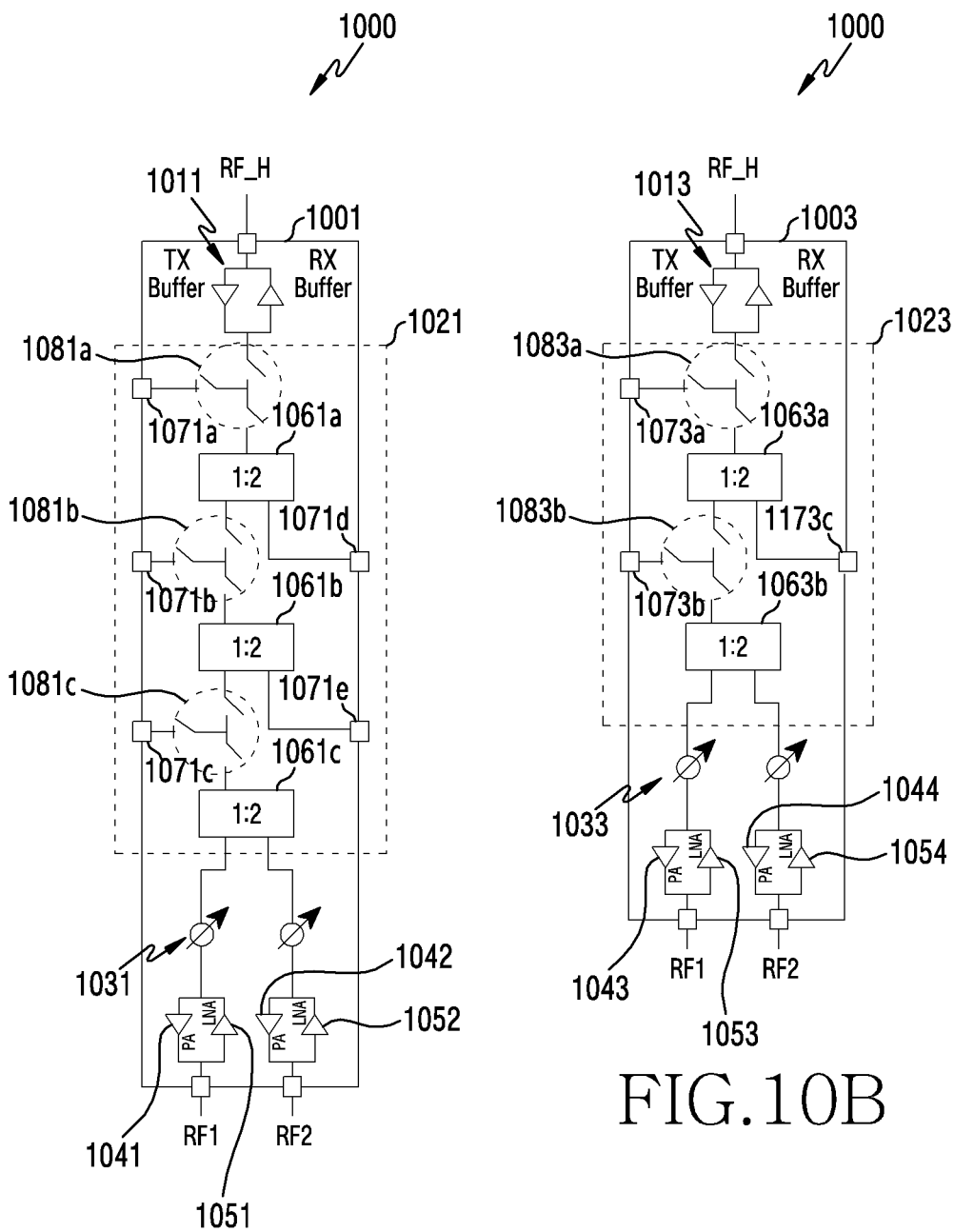
FIG. 10A illustrates a front end module (FEM) included in an electronic device, according to an embodiment.
FIG. 10B illustrates a unit FEM included in an electronic device, according to an embodiment.

FIG. 10A illustrates a unit FEM 1000 included in an electronic device, according to an embodiment. FIG. 10B illustrates a unit FEM 1000 included in an electronic device, according to an embodiment.

Referring to FIGS. 10A and 10B, a unit FEM 1001 or 1003 may be configured such that one RF input signal RF_H is split into two signals RF1 and RF2 for two antenna elements.

The unit FEM 1001 or 1003 may respectively include a buffer 1011 or 1013, a splitter-coupler 1021 or 1023, a phase shifter 1031 or 1033, PAs 1041 to 1044, or LNAs 1051 to 1054.

The splitter-coupler 1021 or 1023 may depend on the number of maximum antenna elements that can split an RF signal.

FIG. 10A illustrates a unit FEM that can split an RF signal maximally to eight antenna elements and FIG. 10B illustrates a unit FEM that can split an RF signal maximally to four antenna elements. The number of the maximum supportable antenna elements may be determined, based on the configuration of the splitter-coupler 1021 or 1023 of the unit FEM.

Referring to FIG. 10A, the splitter-coupler 1021 may include several switches 1081a, 1081b, and 1081c for controlling connection between three splitter-coupler elements 1061a, 1061b, and 1061c and parts, and terminals 1071a, 1071b, 1071c, 1071d, and 1071e for connection with the splitter-coupler of another unit FEM in order to split an RF signal to maximally eight antenna elements.

Referring to FIG. 10B, the splitter-coupler 1023 may include several switches 1083a and 1083b for controlling connection between two splitter-coupler elements 1063a and 1063b and parts, and/or terminals 1073a, 1073b, and 1073c for connection with the splitter-coupler of another unit FEM in order to split an RF signal to four antenna elements maximally.

For example, a unit FEM including k splitter-coupler elements can transmit a signal maximally to 2k antenna elements by being connected with another unit FEM and may include 2k-1 terminals and k switches. For example, k switches may be single pole double throw (STDP) type switches or each may include three single pole single throw (SPST) type switches that can transmit an RF signal. The switches may be implemented as semiconductor logics.

Figure 11:
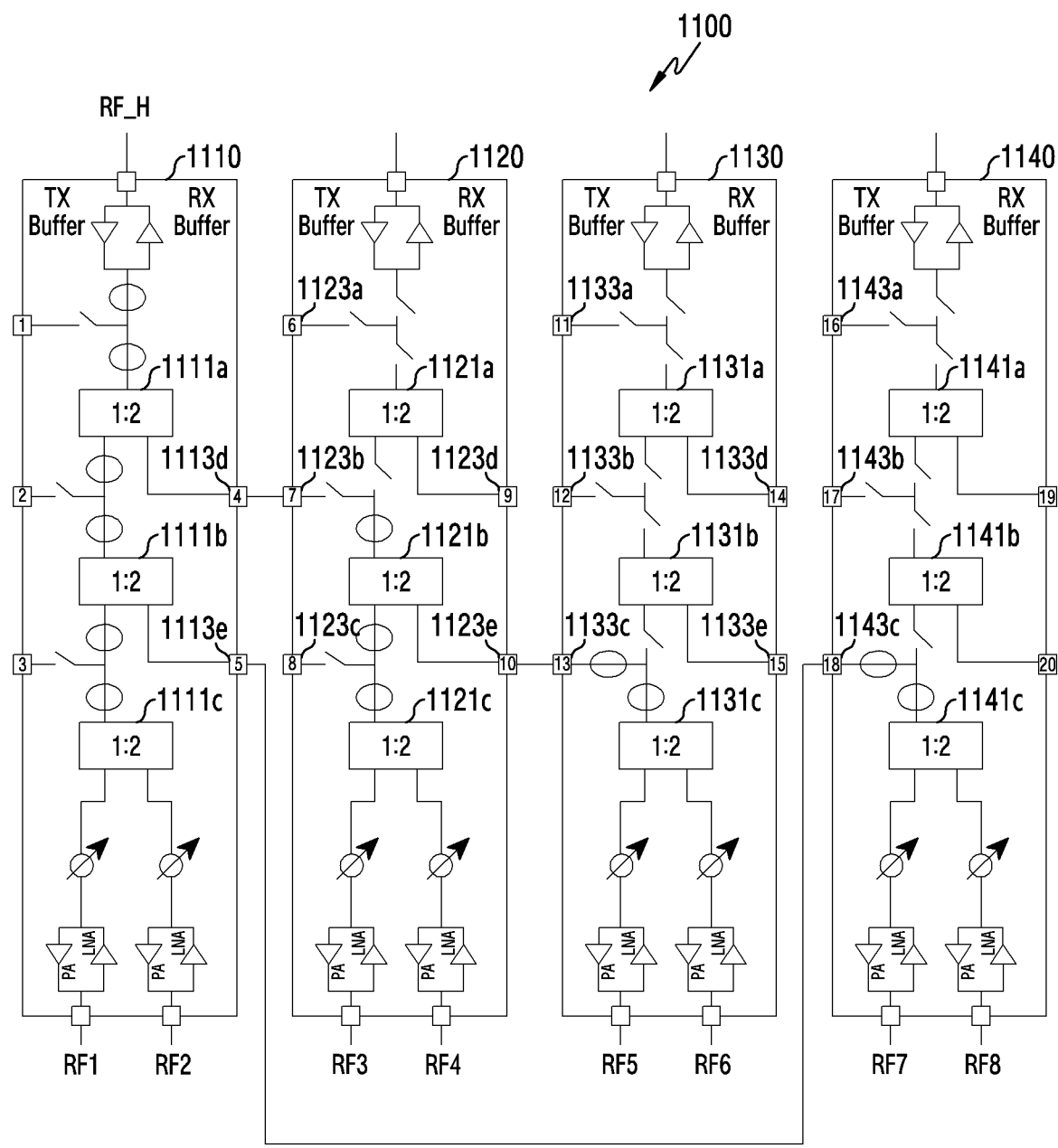
FIG. 11 illustrates an antenna module in an electronic device, according to an embodiment.
Figure 12:
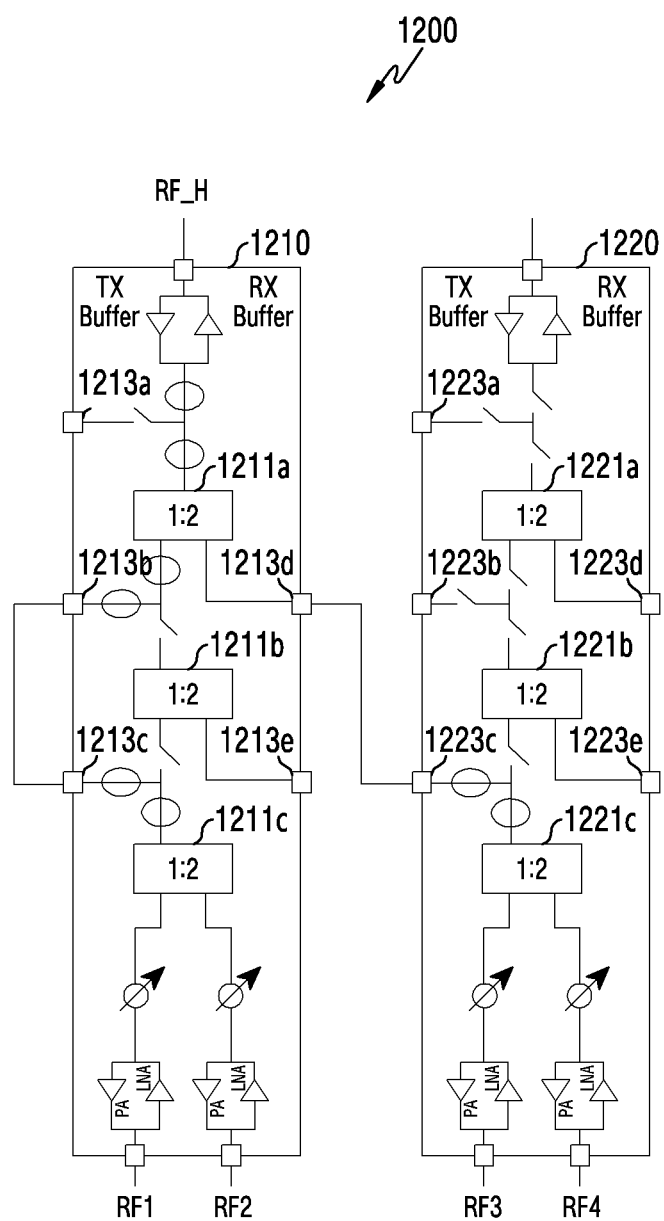
FIG. 12 illustrates an antenna module in an electronic device, according to an embodiment.
Figure 13:
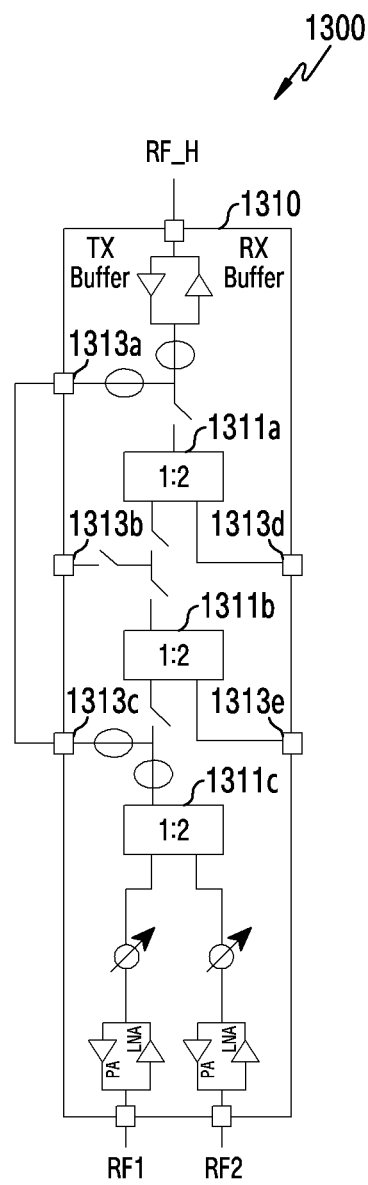
FIG. 13 illustrates an antenna module in an electronic device, according to an embodiment.

FIGS. 11 to 13 illustrate an antenna module in an electronic device, according to various embodiments.

More specifically, views 1100, 1200, and 1300 show the configuration of an antenna module supporting a plurality of antenna elements using a plurality of unit FEMs.

The antenna module shown in FIGS. 11 to 13 can support a plurality of antenna elements using a plurality of unit FEMs. The antenna module may have a structure that splits an RF_H signal to a plurality of antenna elements. An antenna module that splits an RF_V signal to a plurality of antenna elements may have various input signals. For example, an RF_V signal may be input with an RF_H signal to the antenna module shown in FIGS. 11 to 13. In this case, the antenna module can split an RF_V signal into a plurality of antenna elements. That is, one antenna element can receive and radiate an RF_H signal and an RF_V signal.

Referring to FIG. 11, an antenna module can split a received RF_H signal into signals RF1 to RF8 for eight antenna elements. The signals RF1 to RF8 for eight antenna elements may be generated by an RF_H signal that passes through splitter-coupler elements three times. In this case, signal attenuation of about 3 dB is generated, for example, every time passing through a splitter-coupler element, so the signals RF1 to RF8 for all the antenna elements may have the same signal intensity.

The antenna module may include first to fourth unit FEMs that are four unit FEMs to generate signals RF1 to RF8 for eight antenna elements.

The first unit FEM 1110 can connect switches (portions indicated by ○) such that RF1 and RF2 signals are generated from an RF_H signal through a first splitter-coupler element 1111*a*, a second splitter-coupler element 1111*b*, and a third splitter-coupler element 1111*c*.

The second unit FEM 1120 including splitter-coupler element 1121*a*, and terminals 1123*a*, 1123*c*, 1123*d* and 1123*e*, can connect switches (portions indicated by ○) such that RF3 and RF4 signals are generated from an RF_H signal, which is input through a seventh terminal 1123*b*, through a fifth splitter-coupler element 1121*b* and a sixth splitter-coupler element 1121*c*. The RF_H signal input through the seventh terminal 1123*b* may be a signal that is input to the first unit FEM 1110 and then output to a fourth terminal 1113*d* (e.g., the terminal connected with the first splitter-coupler element 1121*a*). Accordingly, the RF3 and RF4 can be generated through three splitter-coupler elements of the first splitter-coupler element 1111*a* of the first unit FEM 1110, and the fifth splitter-coupler element 1121*b* and the sixth splitter-coupler element 1121*c* of the second unit FEM 1120.

The third unit FEM 1130 including splitter-coupler elements 1131*a* and 1131*b*, and terminals 1133*a*, 1133*b*, 1133*c*, 1133*d* and 1133*e*, can connect switches (portions indicated by ○) such that RF5 and RF6 signals are generated from an RF_H signal, which is input through a thirteenth terminal 1133*c*, through a ninth sixth splitter-coupler element 1131*c*. The RF_H signal input through the thirteenth terminal 1133*c* may be a signal that is input to a seventh terminal 1123*b* of the second unit FEM 1120 and then output to a tenth terminal 1113*d* (e.g., the terminal connected with the first splitter-coupler element 1111*a*).

Accordingly, the RF5 and RF6 can be generated through three splitter-coupler elements of the first splitter-coupler element 1111*a* of the first unit FEM 1110, the second splitter-coupler element 1121*b* of the second unit FEM 1120, and the third splitter-coupler element 1131*c* of the third unit FEM 1130.

The fourth unit FEM 1140 including splitter-coupler elements 1141*a* and 1141*b*, and terminals 1143*a* and 1143*b*, can connect switches (portions indicated by ○) such that RF7 and RF8 signals are generated from a signal that is output from a fifth terminal 1113*e* connected with the second splitter-coupler element 1111*b* of the first unit FEM 1110, is input to the third terminal 1143*c*, and then passes through the third splitter-coupler element 1141*c*. Accordingly, the RF7 and RF8 can be generated through three splitter-coupler elements of the first splitter-coupler element 1111*a* and the second splitter-coupler element 1111*b* of the first unit FEM 1110, and the third splitter-coupler element 1141*c* of the fourth unit FEM 1140.

The signals RF1 to RF8 that are transmitted to eight antenna elements through the connection described above may be signals after an RF_H signal passes through three splitter-coupler elements. The insides of the unit FEMs 1110, 1120, 1130, and 1140 can be adjusted by switch connection and the FEMs may be connected through lines on the PCB of the antenna module.

An antenna module may include eight unit FEMs and eight antenna elements. The eight antenna elements may be disposed on a first surface of the antenna module. The eight unit FEMs may be disposed on a second surface of the antenna module. The antenna module may form 1×8 array antenna, 2×4 array antenna, or other types of array antenna configuration, depending on the arrangement of antenna elements. The eight unit FEMs may be classified into four unit FEMs that generate and supply signals RF1 to RF8 for eight antenna elements to the antenna elements by dividing an input RF_H signal and four unit FEMs that generate and supply signals for eight antenna elements to the antenna elements by dividing an RF_V signal in the same way. The electronic device may include eight FEMs for eight antenna elements. The eight FEMs may be composed of four FEMs for an RF-H and four FEMs for RF-V.

Referring to FIG. 12, an RF_H signal received to an antenna module can be split into signals RF1 to RF4 for four antenna elements. The signals RF1 to RF4 for the antenna elements may be generated by an RF_H signal passing through splitter-coupler elements two times. For example, since signal attenuation of about 3 dB is generated every time passing a splitter-coupler element, an input signal RF_H should pass through the same number of splitter-coupler elements in order such that signals RF1 to RF4 for antenna elements all have the same signal intensity.

Two unit FEMs 1210 and 1220 may be included to generate signals RF1 to RF4 for fourth antenna elements. The first unit FEM 1210 of the two unit FEMs includes terminals 1213*a* and 1213*e*. The second unit FEM 1220 of the two unit FEMs includes splitter-coupler elements 1221*a* and 1221*b*, and terminals 1223*a*, 1223*b*, 1223*d*, 1223*e*. The first unit FEM 1210 of the two unit FEMs can connect switches (portions indicated by ○) and can connect a second terminal 1213*b* and a third terminal 1213*c* to a PCB line of the antenna module such that RF1 and RF2 signals are generated by an RF_H signal detouring around the splitter-coupler element 1211*b* and passing through the first splitter-coupler element 1211*a* and the third splitter-coupler element 1211*c*.

The second unit FEM 1220 can connect switches (portions indicated by ○) such that RF3 and RF4 signals are generated by a signal output from a fourth terminal 1213*d* connected with the first splitter-coupler element 1121*a* of the first unit FEM 1210, received to a third terminal 1223*c*, and passing through a third splitter-coupler element 1221*c*. Accordingly, the RF3 and RF4 can be formed through two splitter-coupler elements of the first splitter-coupler element 1211*a* of the first unit FEM 1210 and the third splitter-coupler element 1221*c* of the second unit FEM 1220.

The signals RF1 to RF4 that are transmitted to four antenna elements through the connection described above may be signals after an RF_H signal passes through two splitter-coupler elements. The insides of the first unit FEM 1210 and the second unit FEM 1220 can be adjusted by switch connection and the FEMs may be connected through lines on the PCB of the antenna module.

Four antenna elements may be disposed on a first surface of an antenna module and four unit FEMs may be disposed on a second surfaces of the antenna module. The four unit FEMs disposed on the second surface of the antenna module may include two unit FEMs for RF-H for processing an RF-H signal and two unit FEMs for RF-V for processing an RF-V signal. The two unit FEMs for RF-H can divide an input RF_H signal into signals RF1 to RF4 for four antenna elements and can supply the divided signals RF1 to RF4 to four antenna elements for RF H included in the antenna module. The two unit FEMs for RF-V can divide an input RF_V signal into signals RF5 to RF8 for four antenna elements and can supply the divided signals RF5 to RF8 to four antenna elements for RF_V included in the antenna module.

An antenna module may have different structures, depending on the arrangement of antennas. The antenna module, for example, may have antenna configurations such as a 1×4 array antenna, a 2×2 array antenna, an L-shaped array antenna, or a +-shaped array antenna.

Referring to FIG. 13, an antenna module can split an RF_H signal to be transmitted into signals RF1 and RF2 for two antenna elements. The signals RF1 and RF2 for the antenna elements may be generated by an RF_H signal passing through a splitter-coupler element one time. For example, since signal attenuation of about 3 dB is generated every time passing a splitter-coupler element, an input signal RF H should pass through the same number of splitter-coupler elements in order such that the signals RF1 and RF2 for the antenna elements have the same signal intensity.

One unit FEM 1310 may be included to generate signals RF1 and RF2 for two antenna elements. The unit FEM 1310 includes splitter-coupler elements 1311a, 1311b and 1311c, and terminals 1313a, 1313b, 1313c, 1313d and 1313e, with terminals 1313a and 1313c respectively configured to connect switches (portions indicated by o) such that RF1 and RF2 signals are generated from an RF_H signal detouring around a first splitter-coupler element 1131a and a second splitter-coupler element 1131b and passing through a third splitter-coupler element 1131c. In this case, a first terminal 1313a may be connected to a third terminal 1313c through a PCB line of the antenna module.

The signals RF1 and RF2 that are transmitted to two antenna elements through the connection described above may be signals after an RF_H signal passes through one splitter-coupler element. The inside of the unit FEM 1310 can be adjusted by only simple switch connection and terminals can be connected using lines on the PCB of the antenna module to detour around internal splitter-coupler elements.

One unit FEM that generates and supplies signals RF1 and RF2 for two antenna elements to the antenna elements by dividing an RF_H signal to be transmitted and one unit REM that generates and supplies signals for the two antenna elements to the antenna element by dividing an RF_V signal may be disposed on a second surface of an antenna module. A 1×2 array antenna can be configured by disposing two antenna elements on a first surface of the antenna module.

Referring to FIG. 9, an RFIC may include a first switch/splitter-couplers 941 and a second switch/splitter-couplers 943 that can divide signals IF_H and IF_V from an IFIC into a plurality of RF signals. In this case, it is possible to form various array antenna structures, depending on the arrangement of a plurality of antenna modules in an electronic device.

Figure 14:
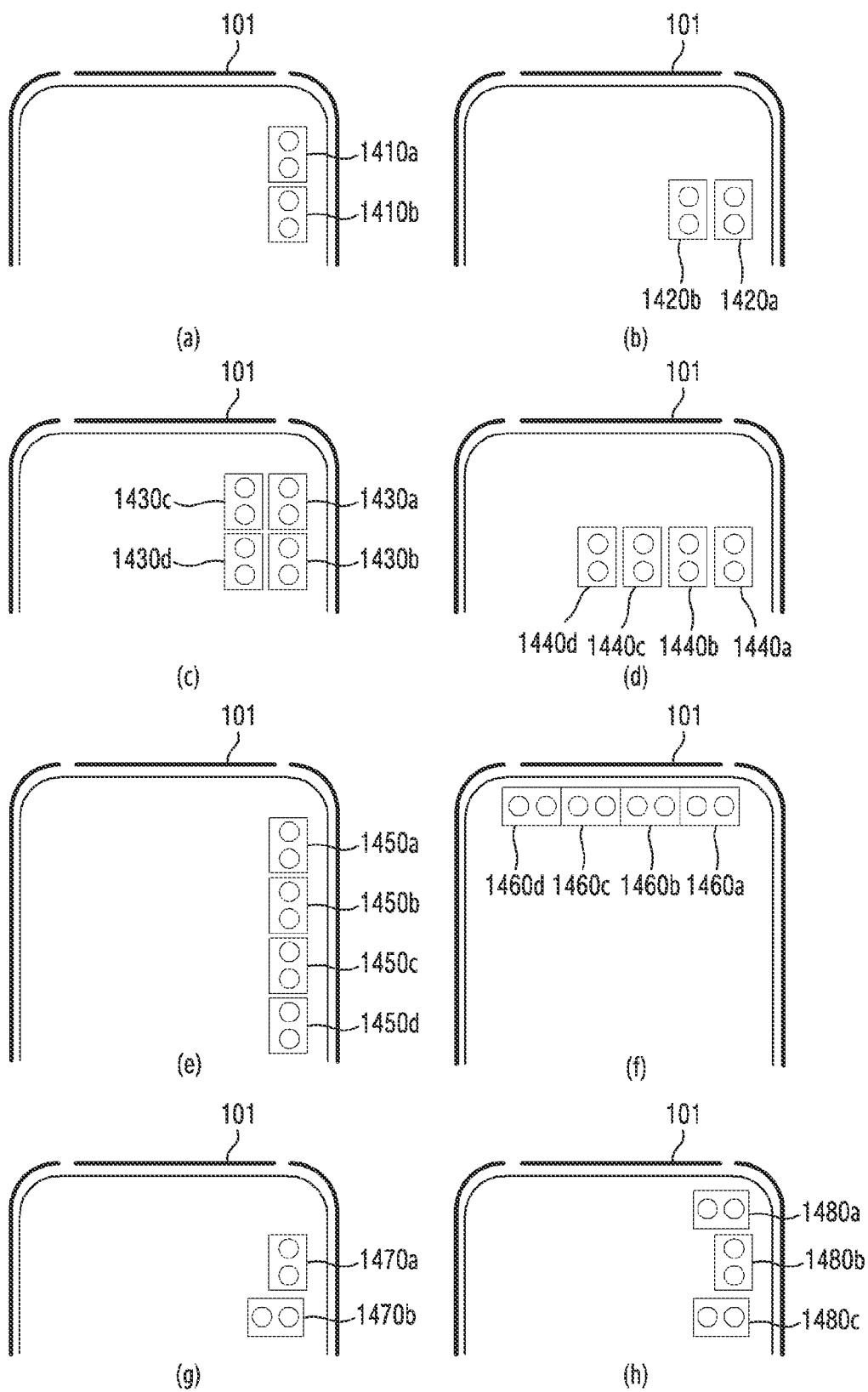
FIG. 14 illustrates a plurality of antenna modules disposed in an electronic device, according to various embodiments.

FIG. 14 illustrate a plurality of antenna modules disposed in an electronic device 101, according to various embodiments.

Referring to FIG. 14(a) to FIG. 14(h), an array antenna structure may be configured in various types, using antenna modules 1410a to 1410b; 1420a to 1420b; 1430a to 1430d; 1440a to 1440d; 1450a to 1450d; 1460a to 1460d; 1470a to 1470b; and 1480a to 1480c of a 1×2 array antenna configuration. Examples of the structure of the array antenna may be achieved in various ways other than those shown in the figures.

It is possible to form a 1×4 array antenna 1410a, 1410b shown in FIG. 14(a); a 2×2 array antenna 1420a, 1420b shown in FIG. 14(b); a 2×4 or 4×2 array antenna 1430a, 1430b, 1430c, 1430d or 1440a, 1440b, 1440c, 1440d shown in FIG. 14(c) or FIG. 14(d); a 1×8 or 8×1 array antenna 1450a, 1450b, 1450c, 1450d or 1460a, 1460b, 1460c, 1460d shown in FIG. 14(e) or FIG. 14(f); or even different types array antennas 1470a, 1470b or 1480a, 1480b shown in FIG. 14(g) and FIG. 14(h) by positioning an antenna module including 1×2 array antennas in various ways in the electronic device 101.

Although antenna modules having the same shape are used in the various embodiments shown in FIG. 14, it may be possible to form various shapes of array antenna structures using different shapes of antenna modules in other various embodiments.

Further, although it was fundamentally described above that only one RFIC is positioned on a PCB, it may be possible to implement various shapes of array antennas and transmit signals in a plurality of frequency bands by disposing a plurality of RFICs and enabling the RFICs to generate and each transmit a signal for at least one antenna module.

Figure 15:
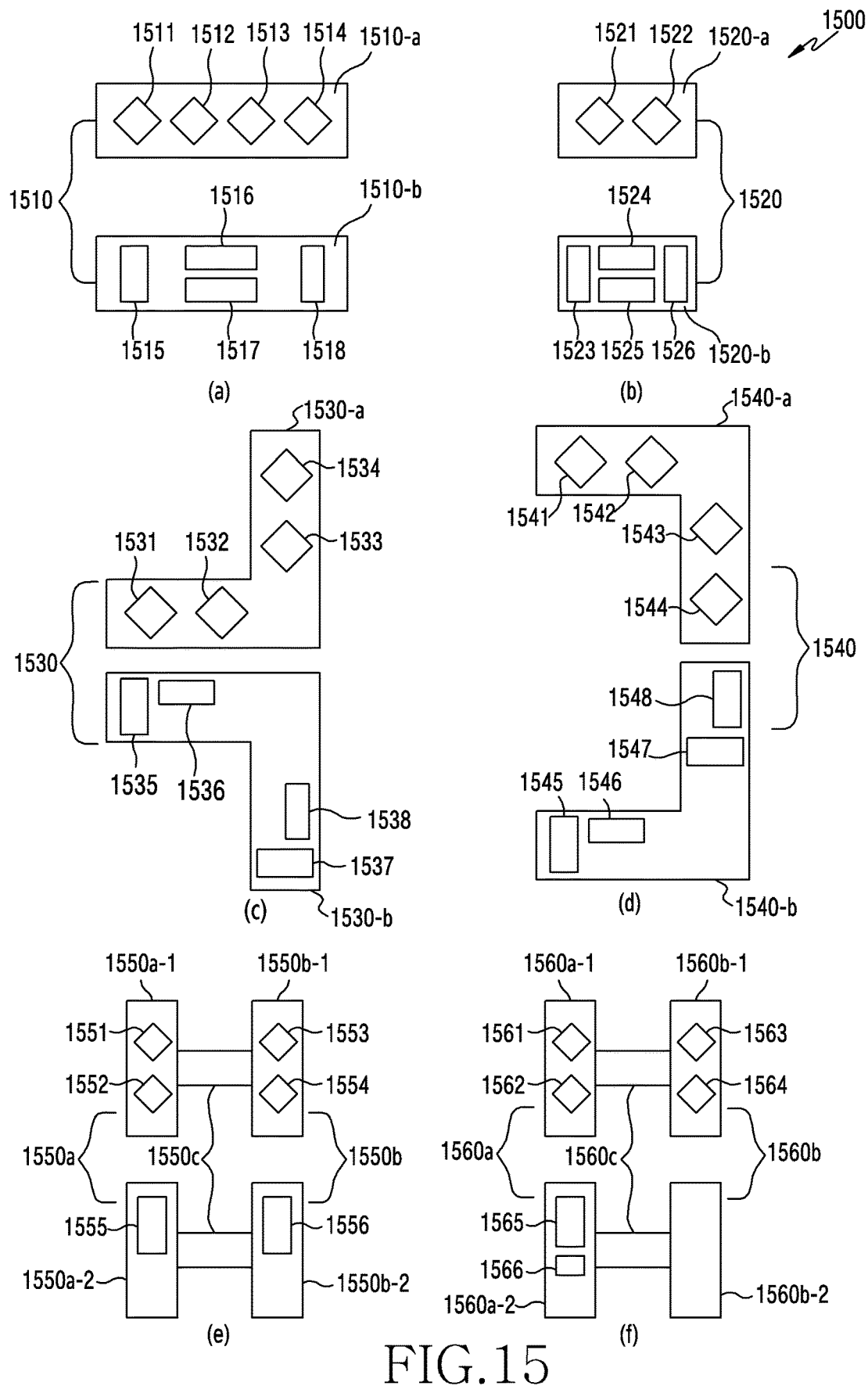
FIG. 15 illustrates different examples of an antenna module in the electronic device, according to various embodiments.

FIG. 15 illustrates different examples of an antenna module in the electronic device 101, according to various embodiments.

FIG. 15(a) to FIG. 15(d) show examples of an antenna module (e.g., a mm Wave module) using a PCB 1510, 1520, 1530, and 1540. In the examples shown in (a)-(d) of FIG. 15, two front end chips 1516 & 1517, 1524 & 1525, 1536 & 1537, and 1546 & 1547 may be disposed on a surface (e.g., the front surface) 1510-b, 1520-b, 1530-b, and 1540-b of the PCB 1510, 1520, 1530, and 1540, respectively. A plurality of antenna elements 1511-1514, 1521-1522, 1531-1534, and 1541-1544 may be disposed on a different surface (e.g., the rear surface) 1510-a, 1520-a, 1530-a, and 1540-a, respectively. The two front end chips may be electrically connected with the plurality of antenna elements 1511-1514, 1521-1522, 1531-1534, and 1541-1544. The plurality of antenna elements 1511-1514, 1521-1522, 1531-1534, and 1541-1544 respectively disposed on the PCBs may be configured as one or two antenna arrays.

FIG. 15(e) and FIG. 15(f) show examples of an antenna module (e.g., a mm Wave module) using a plurality of PCBs 1550a-c and 1560a-c. Front end chips 1555, 1556, and 1565 may be disposed on a surface 1550a-2, 1550b-2, and 1560a-2 (e.g., the front surface) of PCBs 1550a, 1550b, and 1560a. A plurality of antenna elements 1551-1554 and 1561-1564 may be disposed on a different surface (e.g., the rear surface) 1550a-1, 1550b-1, 1560a-1, and 1560b-1 of PCBs 1550a, 1550b, 1560a, and 1560b. The front chips 1555, 1556, and 1565 may be electrically connected with a plurality of antenna elements 1551-1554 and 1561-1564. Some antenna elements 1563 of the plurality of antenna elements 1551-1554 and 1561-1564 may be electrically connected with the front end chip 1565 disposed on another PCB 1560a. The plurality of antenna elements 1551-1554 and 1561-1564, respectively disposed on the PCBs may configure one antenna array. The PCBs 1550a, 1550b, 1560a, and 1560b on which the antenna elements 1551-1554 and 1561-1564 and/or the front end chips 1555, 1556, and 1565 are disposed may be connected by an FPCB.

Referring to FIGS. 15(a) to 15(f), an antenna module according to an embodiment may include at least one PCB 1510, 1520, 1530, 1540, 1550*a-c*, and 1660*a-c* including several antenna elements and at least one front end chip.

FIG. 15(*a*) illustrates an example in which an antenna module including the PCB 1510 includes four antenna elements (first to fourth antennas 1511, 1512, 1513, and 1514), according to an embodiment.

Referring to FIG. 15(*a*) to FIG. 15(*e*), the PCB 1510 may have two surfaces (e.g., a front surface and a rear surface). In FIG. 15(*a*), the first to fourth antenna elements 1511, 1512, 1513, and 1514 may be positioned on a surface 1510-*a* (e.g., the front surface) of the PCB 1510. A first front end chip 1516 or a second front end chip 1517 may be positioned on a different surface 1510-*b* (opposite surface to one surface 1510-*a*) (e.g., the rear surface) of the PCB 1510. In FIG. 15A, an RFIC 1515 and a PMIC 1518 may be further positioned on the other surface 1510-*b* of the PCB 1510.

Referring to FIG. 15(*a*), at least one antenna element of the first to fourth antenna elements 1511, 1512, 1513, and 1514 may be used to transmit and receive a wireless signal, and another at least one antenna element may be used to receive a wireless signal.

Referring to FIG. 15(*a*), the first front end chip 1516 may be electrically connected with the first antenna element 1511 and the second antenna element 1512, and the second front end chip 1517 may be electrically connected with the third antenna element 1513 and the fourth antenna element 1514. For example, the first front end chip 1516 may be electrically connected with the first antenna element 1511 and the second antenna element 1512 through a via hole, and/or the second front end chip 1517 may be electrically connected with the third antenna element 1513 and the fourth antenna element 1514 through a via hole.

FIG. 15(*b*) illustrates an example in which an antenna module including the PCB 1520 includes two antenna elements (first and second antenna elements 1521 and 1522), according to an embodiment.

Referring to FIG. 15(*b*), the PCB 1520 may have two surfaces (e.g., a front surface and a rear surface). In FIG. 15B, the first and second antenna elements 1521 and 1522 may be positioned on one surface 1520-*a* (e.g., the front surface) of the PCB 1520. A first front end chip 1524 or a second front end chip 1525 may be positioned on another surface 1520-*b* (opposite surface to one surface 1510-*a*) (e.g., the rear surface) of the PCB 1520. In FIG. 15(*b*), an RFIC 1523 and a PMIC 1526 may be further positioned on the other surface 1520-*b* of the PCB 1520.

Referring to FIG. 15(*b*), at least one antenna element of the first and second antenna elements 1521 and 1522 may be used to transmit and receive a wireless signal, and the other one antenna element may be used to receive a wireless signal.

In FIG. 15(*b*), the first front end chip 1524 may be electrically connected with the first antenna element 1521, and the second front end chip 1525 may be electrically connected with the second antenna element 1522. For example, the first front end chip 1524 may be electrically connected with the first antenna element 1521 through a via hole, and/or the second front end chip 1525 may be electrically connected with the second antenna element 1522 through a via hole.

When the PCBs have a multilayer structure in FIGS. 15(*a*) and 15(*b*), at least two antenna elements may be positioned on the top of the upper plate of the PCBs having the multilayer structure, and at least two front end chips may be positioned on the top of the lower plate of the PCBs having the multilayer structure.

FIG. 15(*c*) illustrates an example in which an antenna module including the PCB 1530 includes four antenna elements (e.g., first to fourth antennas 1531, 1532, 1533, and 1534), according to an embodiment.

Referring to FIG. 15(*c*), the PCB 1530 may have two surfaces (e.g., a front surface and a rear surface). In FIG. 15(*c*), the first to fourth antenna elements 1531, 1532, 1533, and 1534 may be positioned on one surface 1530-*a* (e.g., the front surface) of the PCB 1530. A first front end chip 1536 or a second front end chip 1537 may be positioned on another surface 1530-*b* (opposite surface to one surface 1530-*a*) (e.g., the rear surface) of the PCB 1530. In FIG. 15(*c*), an RFIC 1535 and a PMIC 1538 may be further positioned on the other surface 1530-*b* of the PCB 1530.

Referring to FIG. 15(*c*), the first and second antenna elements 1531 and 1532 disposed in the direction of a horizontal axis (x-axis) (horizontal direction) at the lower portion of the first to fourth antenna elements 1531, 1532, 1533, and 1534 may be used to transmit and receive a wireless signal, and the third and fourth antenna elements 1533 and 1534 disposed in the direction of a vertical axis (y-axis) (vertical direction) at the right side may be used to receive a wireless signal Additionally or alternatively, the third and fourth antenna elements 1533 and 1534 disposed in the direction of a vertical axis (y-axis) (vertical direction) at the right side may be used to transmit and receive a wireless signal, and the first and second antenna elements 1531 and 1532 disposed in the direction of a horizontal axis (x-axis) (horizontal direction) at the lower portion may be used to receive a wireless signal.

Referring to FIG. 15(*c*), the first front end chip 1536 may be electrically connected with the first and second antenna elements 1531 and 1532, and the second front end chip 1537 may be electrically connected with the third and fourth antenna elements 1533 and 1534. For example, the first front end chip 1536 may be electrically connected with the first and second antenna elements 1531 and 1532 through a via hole, and/or the second front end chip 1537 may be electrically connected with the third and fourth antenna elements 1533 and 1534 through a via hole.

Referring to FIG. 15(*c*), the RFIC 1535 and the first front end chip 1536 may be disposed in the direction of a horizontal axis (x-axis) (horizontal direction) at the upper portion, and the second front end chip 1537 and the PMIC 1538 may be disposed in the direction of a vertical axis (y-axis) (vertical direction) at the right side.

FIG. 15(*d*) illustrates an example including four antenna elements (e.g., first to fourth antenna elements 1541, 1542, 1543, and 1544) including a PCB 1540, according to an embodiment.

Referring to FIG. 15(*d*), the PCB 1540 may have two surfaces (e.g., a front surface and a rear surface). In FIG. 15(*d*), the first to fourth antenna elements 1541, 1542, 1543, and 1544 may be positioned on one surface 1540-*a* (e.g., the front surface) of the PCB 1540. A first front end chip 1546 or a second front end chip 1547 may be positioned on another surface 1540-*b* (opposite surface to one surface 1540-*a*) (e.g., the rear surface) of the PCB 1540. In FIG. 15(*d*), an RFIC 1545 and a PMIC 1548 may be further positioned on the other surface 1545-*b* of the PCB 1540.

Referring to FIG. 15(*d*), the first and second antenna elements 1541 and 1542 disposed in the direction of a horizontal axis (x-axis) (horizontal direction) at the upper portion of the first to fourth antenna elements 1541, 1542, 1543, and 1544 may be used to transmit and receive a wireless signal, and the third and fourth antenna elements 1543 and 1544 disposed in the direction of a vertical axis (y-axis) (vertical direction) at the right side may be used to receive a wireless signal. Additionally or alternatively, the third and fourth antenna elements 1543 and 1544 disposed in the direction of a vertical axis (y-axis) (vertical direction) at the right side may be used to transmit and receive a wireless signal, and the first and second antenna elements 1541 and 1542 disposed in the direction of a horizontal axis (x-axis) (horizontal direction) at the upper portion may be used to receive a wireless signal.

Referring to FIG. 15(*d*), the first front end chip 1546 may be electrically connected with the first and second antenna elements 1541 and 1542, and the second front end chip 1547 may be electrically connected with the third and fourth antenna elements 1543 and 1544. For example, the first front end chip 1546 may be electrically connected with the first and second antenna elements 1541 and 1542 through a via hole, and/or the second front end chip 1547 may be electrically connected with the third and fourth antenna elements 1543 and 1544 through a via hole.

Referring to FIG. 15(*d*), the RFIC 1545 and the first front end chip 1546 may be disposed in the direction of a horizontal axis (x-axis) (horizontal direction) at the lower portion, and the second front end chip 1547 and the PMIC 1548 may be disposed in the direction of a vertical axis (y-axis) (vertical direction) at the right side.

When the PCBs have a multilayer structure in FIGS. 15(*c*) and 15(*d*), at least two antenna elements may be positioned on the top of the upper plate of the PCBs having the multilayer structure, and at least two front end chips may be positioned on the top of the lower plate of the PCBs having the multilayer structure.

FIG. 15(*e*) illustrates an example in which an antenna module including three PCBs 1550*a*, 1550*b*, and 1550*c* includes four antenna elements (e.g., first to fourth antenna elements 1551, 1552, 1553, and 1554), according to an embodiment.

Referring to FIG. 15(*e*), an antenna module may include several PCBs 1550*a*, 1550*b*, and 1550*c* including several antennas and a plurality of front end chips. The several PCBs 1550*a*, 1550*b*, and 1550*c* each may have two surfaces (e.g., a front surface and a rear surface). In FIG. 15(*e*), a first PCB 1550*a* and a second PCB 1550*b* may be connected by a third PCB 1550*c*. The third PCB 1550*c* may be a flexible PCB (FPCB).

In FIG. 15(*e*), the first and second antenna elements 1551 and 1552 may be positioned on a first surface 1550*a*-1 (e.g., the front surface) corresponding to one surface of the first PCB 1550*a*. A first front end chip 1555 may be positioned on a second surface 1550*a*-2 (opposite surface to the surface 1550*a*-1) corresponding to another surface of the first PCB 1550*a*. The first and second antenna elements 1551 and 1552 may be connected to the first front end chip 1555. An RFIC and a PMIC may be further positioned on the second surface 1550*a*-2 of the first PCB 1550*a*. Additionally or alternatively, a connection member (a connector) connecting a main PCB may be further positioned on the second surface 1550*a*-2 of the first PCB 1550*a*.

In FIG. 15(*e*), third and fourth antenna elements 1553 and 1554 may be positioned on a first surface 1550*b*-1 (e.g., the front surface) corresponding to one surface of the second PCB 1550*b*. A second front end chip 1556 may be positioned on a second surface 1550*b*-2 (opposite surface to the surface 1550*b*-1) corresponding to another surface of the second PCB 1550*b*. The third and fourth antenna elements 1553 and 1554 may be connected to the second front end chip 1556. An RFIC and a PMIC may be further positioned on the second surface 1550*b*-2 of the second PCB 1550*b*. Additionally or alternatively, a connection member (a connector) connecting a main PCB may be further positioned on the second surface 1550*b*-2 of the second PCB 1550*b*.

FIG. 15(*f*) shows an example in which an antenna module including three PCBs 1560*a*, 1560*b*, and 1560*c* includes four antenna elements (e.g., first to fourth antenna elements 1561, 1562, 1563, and 1564), according to an embodiment.

Referring to FIG. 15(*f*), an antenna module may include a plurality of PCBs 1560*a*, 1560*b*, and 1560*c* including several antennas and a plurality of front end chips. The several PCBs 1560*a*, 1560*b*, and 1560*c* each may have two surfaces (e.g., a front surface and a rear surface). In FIG. 15(*f*), a first PCB 1560*a* and a second PCB 1560*b* may be connected by a third PCB 1560*c*. The third PCB 1560*c* may be a flexible PCB (FPCB).

In FIG. 15(*f*), the first and second antenna elements 1561 and 1562 may be positioned on a first surface 1560*a*-1 (e.g., the front surface) corresponding to one surface of the first PCB 1560*a*. In FIG. 15(*f*), third and fourth antenna elements 1563 and 1564 (receiving antennas) may be positioned on a first surface 1560*b*-1 (e.g., the front surface) corresponding to one surface of the second PCB 1560*b*. A first front end chip 1565 and a second front end chip 1566 may be positioned on a second surface 1560*a*-2 (opposite surface to the surface 1560*a*-1) corresponding to another surface of the first PCB 1560*a*. The first and second antenna elements 1561 and 1562 may be connected to the first front end chip 1565. The third and fourth antenna elements 1563 and 1564 may be connected to the second front end chip 1566.

In FIG. 15(*f*), an RFIC and a PMIC may be further positioned on the second surface 1560*a*-2 of the first PCB 1560*a* opposite surface 1560*b*-2 of second PCB 1560*b*. Additionally or alternatively, a connection member (a connector) connecting a main PCB may be further positioned on the second surface 1560*a*-2 of the first PCB 1560*a*. Yet further, a connection member connecting the RFIC, the PMIC, and the main PCB may be positioned on the second surface 1560*a*-2 of the second PCB 1560*b* in FIG. 15(*f*).

Figure 16:
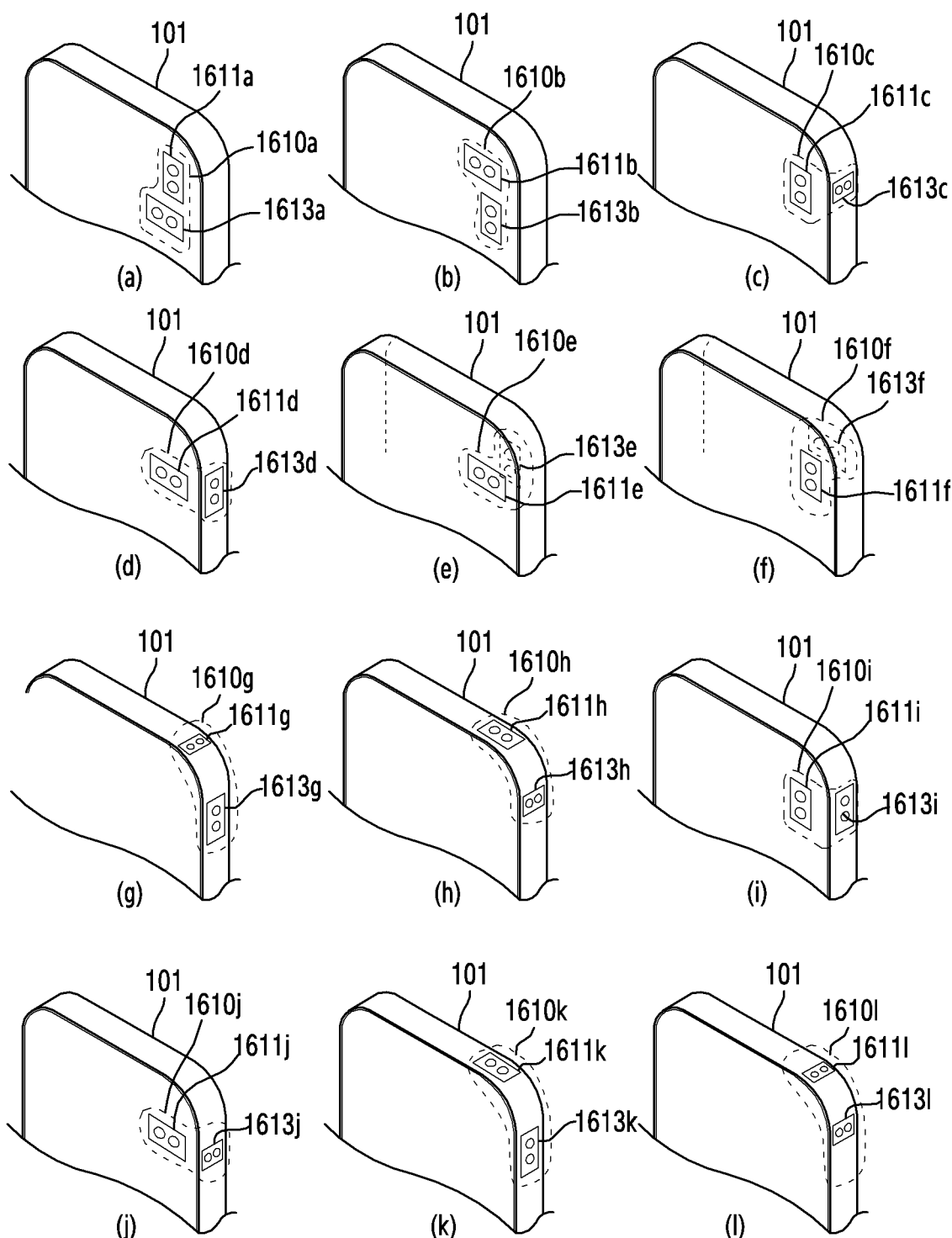
FIG. 16 illustrates different arrangements of antenna arrays included in an antenna module in the electronic device, according to various embodiments.

FIG. 16 illustrates different views showing embodiments of arrangement of antenna arrays included in an antenna module in the electronic device 101, according to various embodiments.

A first antenna array and a second antenna array may be positioned on one surface of one or several PCBs included in an antenna module. The first antenna array and the second antenna array may include several antenna elements. In FIG. 16(*a*) to FIG. 16(*l*), for the convenience of description, it is assumed that the first antenna array includes two antenna elements and the second antenna array also includes two antenna elements.

FIG. 16(*a*) to FIG. 16(*l*) show various embodiments about examples in which one or several PCBs included in an antenna module are disposed in an electronic device 101 and the first antenna array and the second antenna array are positioned in the one or several PCBs. In the figures, the shapes of one or several PCBs in the electronic device are indicated by dotted lines, and the first antenna array and the second antenna array positioned on the one or several PCBs are indicated by solid lines on the corresponding PCBs. The shapes of the one or several PCBs indicated by dotted lines may not be completely the same as the actually implemented shapes, but may have shapes curved by the several PCBs in accordance with the positions the first antenna array and the second antenna. FIG. 16(*a*) to FIG. 16(*l*) show various examples in which the positions of two antenna elements are changed in the first and second antenna elements positioned on the PCB.

A rectangular coordinate system may be used to describe several antenna array arrangement in the electronic device 101. For example, in the rectangular coordinate system, the direction of the X-axis may indicate the transverse direction of the electronic device 101, the direction of the Y-axis may be the longitudinal direction of the electronic device 101, and the direction of the Z-axis may be the thickness direction of the electronic device 101. For example, the X-axis and Z-axis may be the horizontal direction and the Y-axis may be the vertical direction.

The electronic device 101 may have a fronts surface (a first plate) facing the Z(+)-axial direction, a rear surface (a second plate) (e.g., a back cover) facing the Z(−)-axial direction, and a plurality of sides (e.g., side members) facing the X-axial and Y-axial directions. For example, the sides may include an upper side facing the Y(+)-axial direction, a lower side facing the Y(−)-axial direction, a right side facing the X(+)-axial direction, and a left side facing the X(−)-axial direction.

Referring to the electronic device 101 of FIG. 16(a), one surface (e.g., the front surface or the rear surface) of a PCB 1610a on which first and second antenna arrays 1611a and 1613a are positioned may be disposed to face the Z(−)-axial direction (e.g., the rear surface) of the electronic device 101. The first and second antenna arrays 1611a and 1613a may be disposed close to each other at one corner area of the electronic device 101.

The two antenna elements included in the first antenna array 1611a positioned on the PCB 1610a may be disposed up and down in the vertical direction (the Y-axial direction), and the two antenna elements included in the second antenna array 1613a positioned on the PCB 1610a may be disposed left and right in the horizontal direction (the X-axial direction). Thus, the direction in which the two antenna elements included in the first antenna array 1611a are disposed and the direction in which the two antenna elements included in the second antenna array 1613a are disposed may be perpendicular to each other.

Referring to the electronic device 101 in FIG. 16(b), one surface (e.g., the front surface or the rear surface) of a PCB 1610b on which first and second antenna arrays 1611b and 1613b are disposed may be disposed to face the Z(−)-axial direction (e.g., the rear surface) of the electronic device 101. The first and second antenna arrays 1611b and 1613b may be disposed close to each other at one corner area of the electronic device 101.

The two antenna elements included in the first antenna array 1611b positioned on the PCB 1610b may be disposed left and right in the horizontal direction (the X-axial direction), and the two antenna elements included in the second antenna array 1613b positioned on the PCB 1610b may be disposed up and down in the vertical direction (the Y-axial direction). Thus, the direction in which the two antenna elements included in the first antenna array 1611b are disposed, and the direction in which the two antenna elements included in the second antenna array 1613b are disposed, may be perpendicular to each other.

Referring to the electronic device 101 in FIG. 16(c), one surface (e.g., the front surface or the rear surface) of a first part on which the first antenna array 1611c is positioned of the PCB 1610c may be disposed to face the Z(−)-axial direction (e.g., the rear surface) of the electronic device 101, and one surface (e.g., the front surface or the rear surface) of a second part on which the second antenna array 1613c is positioned of the PCB 1610c may be disposed to face the X(+)-axial direction (e.g., the right side) of the electronic device 101. The first and second antenna arrays 1611c and 1613c may be disposed close to each other at one corner area of the electronic device 101. The first part and the second part of the PCB 1610c may be connected by a third part.

The two antenna elements included in the first antenna array 1611c positioned on the first part of the PCB 1610c may be disposed up and down in the vertical direction (the Y-axial direction), and the two antenna elements included in the second antenna array 1613c positioned on the second part of the PCB 1610c may be disposed front and back in the horizontal direction (the Z-axial direction). Thus, the direction in which the two antenna elements included in the first antenna array 1611c are disposed and the direction in which the two antenna elements included in the second antenna array 1613c are disposed may be perpendicular to each other.

Referring to the electronic device 101 in FIG. 16(d), one surface (e.g., the front surface or the rear surface) of a first part on which the first antenna array 1611d is positioned of the PCB 1610d may be disposed to face the Z(−)-axial direction (e.g., the rear surface) of the electronic device 101, and one surface (e.g., the front surface or the rear surface) of a second part on which the second antenna array 1613d is positioned of the PCB 1610d may be disposed to face the X(+)-axial direction (e.g., the right side) of the electronic device 101. The first and second antenna arrays 1611d and 1613d may be disposed close to each other at one corner area of the electronic device 101. The first part and the second part of the PCB 1610d may be connected by a third part.

The two antenna elements included in the first antenna array 1611d positioned on the first part of the PCB 1610c may be disposed left and right in the horizontal direction (the X-axial direction), and the two antenna elements included in the second antenna array 1613d positioned on the second part of the PCB 1610d may be disposed up and down in the vertical direction (the Y-axial direction). Thus, the direction in which the two antenna elements included in the first antenna array 1611d are disposed and the direction in which the two antenna elements included in the second antenna array 1613d are disposed may be perpendicular to each other.

Referring to the electronic device 101 in FIG. 16(e), one surface (e.g., the front surface or the rear surface) of a first part on which the first antenna array 1611e is positioned of the PCB 1610e may be disposed to face the Z(−)-axial direction (e.g., the rear surface) of the electronic device 101, and one surface (e.g., the front surface or the rear surface) of a second part on which the second antenna array 1613e is positioned of the PCB 1610e may be disposed to face the Z(+)-axial direction (e.g., the front surface) of the electronic device 101. The first and second antenna arrays 1611e and 1613e may be disposed to face opposite directions at one corner area of the electronic device 101. The first part and the second part of the PCB 1610e may be connected by a third part.

The two antenna elements included in the first antenna array 1611e positioned on the first part of the PCB 1610e may be disposed left and right in the horizontal direction (the X-axial direction), and the two antenna elements included in the second antenna array 1613e positioned on the second part of the PCB 1610e may be disposed up and down in the vertical direction (the Y-axial direction). Thus, the direction in which the two antenna elements included in the first antenna array 1611e are disposed and the direction in which the two antenna elements included in the second antenna array 1613e are disposed may be perpendicular to each other.

Referring to the electronic device 101 in FIG. 16(*f*), one surface of a first part on which the first antenna array 1611*f* is positioned of the PCB 1610*f* may be disposed to face the Z(−)-axial direction (e.g., the rear surface) of the electronic device 101, and one surface of a second part on which the second antenna array 1613*f* is positioned of the PCB 1610*f* may be disposed to face the Z(+)-axial direction (e.g., the front surface) of the electronic device 101. The first and second antenna arrays 1611*f* and 1613*f* may be disposed to face opposite direction at one corner area of the electronic device 101. The first part and the second part of the PCB 1610*f* may be connected by a third part.

The two antenna elements included in the first antenna array 1611*f* positioned on the first part of the PCB 1610*f* may be disposed up and down in the vertical direction (the Y-axial direction), and the two antenna elements included in the second antenna array 1613*f* positioned on the second part of the PCB 1610*f* may be disposed left and right in the horizontal direction (the X-axial direction). Thus, the direction in which the two antenna elements included in the first antenna array 1611*f* are disposed and the direction in which the two antenna elements included in the second antenna array 1613*f* are disposed may be perpendicular to each other.

Referring to the electronic device 101 in FIG. 16(*g*), one surface (e.g., the front surface or the rear surface) of a first part on which the first antenna array 1611*g* is positioned of the PCB 1610*g* may be disposed to face the Y(+)-axial direction (e.g., the upper side) of the electronic device 101, and one surface (e.g., the front surface or the rear surface) of a second part on which the second antenna array 1613*g* is positioned of the PCB 1610*g* may be disposed to face the X(+)-axial direction (e.g., the right side) of the electronic device 101. The first and second antenna arrays 1611*g* and 1613*g* may be disposed close to each other at one corner area of the electronic device 101. The first part and the second part of the PCB 1610*g* may be connected by a third part.

The two antenna elements included in the first antenna array 1611*g* positioned on the first part of the PCB 1610*g* may be disposed front and back in the horizontal direction (the Z-axial direction), and the two antenna elements included in the second antenna array 1613*g* positioned on the second part of the PCB 1610*g* may be disposed up and down in the vertical direction (the Y-axial direction). Thus, the direction in which the two antenna elements included in the first antenna array 1611*g* are disposed and the direction in which the two antenna elements included in the second antenna array 1613*g* are disposed may be perpendicular to each other.

Referring to the electronic device 101 in FIG. 16(*h*), one surface (e.g., the front surface or the rear surface) of a first part on which the first antenna array 1611*h* is positioned of the PCB 1610*h* may be disposed to face the Y(+)-axial direction (e.g., the upper surface) of the electronic device 101, and one surface (e.g., the front surface or the rear surface) of a second part on which the second antenna array 1613*h* is positioned of the PCB 1610*h* may be disposed to face the X(+)-axial direction (e.g., the right side) of the electronic device 101. The first and second antenna arrays 1611*h* and 1613*h* may be disposed close to each other at one corner area of the electronic device 101. The first part and the second part of the PCB 1610*h* may be connected by a third part.

The two antenna elements included in the first antenna array 1611*h* positioned on the first part of the PCB 1610*h* may be disposed left and right in the horizontal direction (the X-axial direction), and the two antenna elements included in the second antenna array 1613*h* positioned on the second part of the PCB 1610*h* may be disposed front and back in the vertical direction (the Z-axial direction). Thus, the direction in which the two antenna elements included in the first antenna array 1611*h* are disposed and the direction in which the two antenna elements included in the second antenna array 1613*h* are disposed may be perpendicular to each other.

Referring to the electronic device 101 in FIG. 16(*i*), one surface (e.g., the front surface or the rear surface) of a first part on which the first antenna array 1611*i* is positioned of the PCB 1610*i* may be disposed to face the Z(−)-axial direction (e.g., the rear surface) of the electronic device 101, and one surface (e.g., the front surface or the rear surface) of a second part on which the second antenna array 1613*i* is positioned of the PCB 1610*i* may be disposed to face the X(+)-axial direction (e.g., the right side) of the electronic device 101. The first and second antenna arrays 1611*i* and 1613*i* may be disposed close to each other at one corner area of the electronic device 101. The first part and the second part of the PCB 1610*i* may be connected by a third part.

The two antenna elements included in the first antenna array 1611*i* positioned on the first part of the PCB 1610*i* may be disposed up and down in the vertical direction (the Y-axial direction), and the two antenna elements included in the second antenna array 1613*i* positioned on the second part of the PCB 1610*i* may be disposed up and down in the vertical direction (the Y-axial direction). Thus, the direction in which the two antenna elements included in the first antenna array 1611*i* are disposed and the direction in which the two antenna elements included in the second antenna array 1613*i* are disposed may be parallel to each other.

Referring to the electronic device 101 in FIG. 16(*j*), one surface (e.g., the front surface or the rear surface) of a first part on which the first antenna array 1611*j* is positioned of the PCB 1610*j* may be disposed to face the Z(−)-axial direction (e.g., the rear surface) of the electronic device 101, and one surface (e.g., the front surface or the rear surface) of a second part on which the second antenna array 1613*j* is positioned of the PCB 1610*j* may be disposed to face the X(+)-axial direction (e.g., the right side) of the electronic device 101. The first and second antenna arrays 1611*j* and 1613*j* may be disposed close to each other at one corner area of the electronic device 101. The first part and the second part of the PCB 1610*j* may be connected by a third part.

The two antenna elements included in the first antenna array 1611*j* positioned on the first part of the PCB 1610*j* may be disposed left and right in the horizontal direction (the X-axial direction), and the two antenna elements included in the second antenna array 1613*j* positioned on the second part of the PCB 1610*j* may be disposed front and back in the vertical direction (the Z-axial direction).

Referring to the electronic device 101 in FIG. 16(*k*), one surface (e.g., the front surface or the rear surface) of a first part on which the first antenna array 1611*k* is positioned of the PCB 1610*k* may be disposed to face the Y(+)-axial direction (e.g., the upper surface) of the electronic device 101, and one surface (e.g., the front surface or the rear surface) of a second part on which the second antenna array 1613*k* is positioned of the PCB 1610*k* may be disposed to face the X(+)-axial direction (e.g., the right side) of the electronic device 101. The first and second antenna arrays 1611*k* and 1613*k* may be disposed close to each other at one corner area of the electronic device 101. The first part and the second part of the PCB 1610*k* may be connected by a third part.

The two antenna elements included in the first antenna array 1611*k* positioned on the first part of the PCB 1610*k* may be disposed left and right in the horizontal direction (the X-axial direction), and the two antenna elements included in the second antenna array 1613*k* positioned on the second part of the PCB 1610*k* may be disposed up and down in the vertical direction (the Y-axial direction).

Referring to the electronic device 101 in FIG. 16(*l*), one surface (e.g., the front surface or the rear surface) of a first part on which the first antenna array 1611*l* is positioned of the PCB 1610*l* may be disposed to face the Y(+)-axial direction (e.g., the upper side) of the electronic device 101, and one surface (e.g., the front surface or the rear surface) of a second part on which the second antenna array 1613*l* is positioned of the PCB 1610*l* may be disposed to face the X(+)-axial direction (e.g., the right side) of the electronic device 101. The first and second antenna arrays 1611*l* and 1613*l* may be disposed close to each other at one corner area of the electronic device 101. The first part and the second part of the PCB 1610*l* may be connected by a third part.

The two antenna elements included in the first antenna array 1611*l* positioned on the first part of the PCB 1610*l* may be disposed front and back in the horizontal direction (the Z-axial direction), and the two antenna elements included in the second antenna array 1613*l* positioned on the second part of the PCB 1610*l* may be disposed front and back in the horizontal direction (the Z-axial direction). Thus, the direction in which the two antenna elements included in the first antenna array 1611*l* are disposed and the direction in which the two antenna elements included in the second antenna array 1613*l* are disposed may be horizontally parallel to each other.

Although antenna modules having the same shape are used in the various embodiments shown in FIG. 16, it may be possible to form various shapes of antenna array structures using different shapes of antenna modules.

Although examples in which antenna arrays are implemented using a 1×2 array antenna and/or a 2×1 array antenna in FIG. 16, an antenna array may also be implemented by disposing two antenna modules employing antennas having various sizes in the electronic device 101.

A mobile communication device includes a processor positioned on a first PCB; an RFIC; and antenna module, in which the antenna module may include a second PCB; first and second antennas positioned on the second PCB; and a plurality of front-end chips positioned on the second PCB, in which the plurality of front-end chips may include a first front-end chip electrically connecting the RFIC and the first antenna, and a second front-end chip electrically connecting the RFIC and the second antenna.

The RFIC may be positioned on the first PCB.

The RFIC may be positioned on the second PCB.

The mobile communication device may further include a third antenna and a fourth antenna that are positioned on the second PCB, in which the third antenna may be electrically connected with the RFIC by the first front-end chip and the fourth antenna may be electrically connected with the RFIC by the second front-end chip.

The first front-end chip may include a first transmission/reception chain and a second transmission/reception chain, in which the first transmission/reception chain may electrically connect the RFIC and the first antenna and the second transmission/reception chain may electrically connect the RFIC and the third antenna; and the second front-end chip may include a third transmission/reception chain and a fourth transmission/reception chain, in which the third transmission/reception chain may electrically connect the RFIC and the second antenna and the fourth transmission/reception chain may electrically connect the RFIC and the fourth antenna.

The first antenna and the third antenna may be configured to operate as a first antenna array for a wireless signal that will be transmitted by the RFIC or a wireless signal that will be received by the RFIC; and the second antenna and the fourth antenna may be configured to operate as a second antenna array for the wireless signal that will be transmitted by the RFIC or the wireless signal that will be received by the RFIC.

The first antenna and the third antenna configured to operate as the first antenna array may be positioned perpendicular to the second antenna and the fourth antenna configured to operate as the second antenna array.

The processor may form at least a portion of a CP and the CP may be configured to form a first beam using the first front-end chip and the first antenna array and to form a second beam using the second front-end chip and the second antenna array.

The CP may be configured to perform an operation of forming the first beam and an operation of forming the second beam such that the first beam and the second beam have the same frequency.

The CP may be configured to perform an operation of forming the first beam toward a first surface of the mobile communication device and an operation of forming a second beam toward a second surface different from the first surface.

The first antenna may be positioned to face the first surface of the mobile communication device, the second antenna may be positioned to face the second surface different from the first surface, and the first front-end chip may be positioned to face a third surface opposite to the first surface.

The second front-end chip may be positioned to face a fourth surface opposite to the second surface.

The second PCB may have a first rigid PCB portion, a second rigid PCB portion, and an FPCB portion connecting the first rigid PCB portion and the second rigid PCB portion; and the first antenna and the first front-end chip may be positioned on the first rigid PCB portion and the second antenna and the second front-end chip may be positioned on the second rigid PCB portion.

The first antenna and the second antenna may be configured to operate an antenna array for a wireless signal that will be transmitted by the RFIC or a wireless signal that will be received by the RFIC.

The RFIC may include a first semiconductor made of a first material, and the first front-end chip or the second front-end chip may include a second semiconductor made of a second material different from the first material.

Accordingly, based on the disclosure, it is possible to configure antenna modules having various shapes using unit FEMs, to quickly and easily cope with a change in shape of an antenna.

Further, the size of the antenna module can be minimized to solve problems associated with a limited space when mounting an antenna module in an electronic device.

Further, it is also possible to configure array antennas having various shapes without changing the shape of an antenna module by combining, disposing, and controlling antenna modules together in an electronic device.

Electronic devices, according to the various embodiments described herein, may be different types of electronic devices. The different types of electronic devices may include, for example, a portable communication device (e.g., a smartphone), a computer system, a notebook, a PDA, a portable multimedia device, and a portable medical device. The different types of electronic devices are not limited to the devices described above.

An arrangement structure, and an electronic device using the arrangement structure, implement and provide a small antenna module, thereby being able to more efficiently use the space that the electronic device has.

Further, the arrangement structure, and an electronic device using the arrangement structure, can implement antenna modules having various shapes using an optimized unit antenna module, and can also reduce circuit part waste.

The effects of the disclosure are not limited to the effects described above and other effects can be clearly understood by those skilled in the art from the description.

Methods according to an embodiment of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The one or more program may include instructions that cause the electronic device to perform the methods according to an embodiment of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Any combination of some or all of them may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described example embodiments of the present disclosure, a component included in the present disclosure is expressed in the singular or the plural according to a presented example embodiment. However, the singular form or plural form is selected for convenience of description suitable for the presented situation, and an embodiment of the present disclosure are not limited to a single element or multiple elements thereof. Further, either multiple elements expressed in the description may be configured into a single element or a single element in the description may be configured into multiple elements.

While the present disclosure has been illustrated and described with reference to an example embodiment thereof, it will be understood by those skilled in the art that various changes in form and details may be made therein without departing from the true spirit and full scope of the present disclosure.

What is claimed:

1. A portable communication device comprising:
 a back cover forming a rear side of the portable communication device;
 a first printed circuit board (PCB);
 a communication processor;
 an intermediate frequency integrated circuit (IFIC);
 a radio frequency integrated circuit (RFIC) converting intermediate frequency (IF) signals received from the IFIC into radio frequency (RF) signals and supporting a mmWave communication, wherein the RFIC includes:
  a first mixer for a first polarization,
  a second mixer for a second polarization,
  a first splitter connected to the first mixer,
  a second splitter connected to the second mixer, and
  a plurality of phase shifters;
 a first antenna module electrically connected with the first PCB through a flexible printed circuit board (FPCB) and including a second PCB and a first antenna array, wherein the first antenna array includes N number of first antenna elements disposed on the second PCB; and
 a second antenna module including a third PCB and a second antenna array including M number of second antenna elements disposed on the third PCB, wherein M is different from N,
 wherein the first mixer of the RFIC is configured to:
  receive, from the IFIC, first IF signals for the first polarization,
  convert the first IF signals into first RF signals for the first polarization,
  transmit, to the first splitter, the first RF signals for the first antenna module,
  receive, from the IFIC, second IF signals for the first polarization,
  convert the second IF signals into second RF signals for the first polarization, and
  transmit, to the first splitter, the second RF signals for the second antenna module,
 wherein the second mixer of the RFIC is configured to:
  receive, from the IFIC, third IF signals for the second polarization,
  convert the third IF signals into third RF signals for the second polarization,
  transmit, to the second splitter, the third RF signals for the first antenna module,
  receive, from the IFIC, fourth IF signals for the second polarization,
  convert the fourth IF signals into fourth RF signals for the second polarization, and
  transmit, to the second splitter, the fourth RF signals for the second antenna module,
 wherein, when the first RF signals are transmitted from the first mixer to the first splitter and the third RF signals are transmitted from the second mixer to the second splitter, the first splitter is configured to generate first split RF signals by splitting the first RF signals according to the N number of the first antenna elements, and the second splitter is configured to generate third split RF signals by splitting the third RF signals according to the N number of the first antenna elements,
 wherein, when the second RF signals are transmitted from the first mixer to the first splitter and the fourth RF signals are transmitted from the second mixer to the second splitter, the first splitter is configured to generate second split RF signals by splitting the second RF signals according to the M number of the second antenna elements, and the second splitter is configured to generate fourth split RF signals by splitting the fourth RF signals according to the M number of the second antenna elements, wherein switches of the first splitter and switches of the second splitter are configured according to the N number of the first antenna elements differently than when the switches of the first splitter and the switches of the second splitter are configured according to the M number of the second antenna elements, wherein first phases of the first split RF signals and third phases of the third split RF signals are shifted by the RFIC including the plurality of phase shifters, and first signals having the shifted first phases and third signals having the shifted third phases are received by the first antenna module through the FPCB such that the first antenna array transmits first wireless signals corresponding to the first signals having the shifted first phases and third wireless signals corresponding to the third signals having the shifted third phases, and wherein second phases of the second split RF signals and fourth phases of the fourth split RF signals are shifted by the RFIC including the plurality of phase shifters, and second signals having the shifted second phases and fourth signals having the shifted fourth phases are received by the second antenna module mounted on the first PCB such that the second antenna array facing the back cover transmits second wireless signals corresponding to the second signals having the shifted second phases and fourth wireless signals corresponding to the fourth signals having the shifted fourth phases in a direction toward the back cover.

2. The portable communication device of claim 1, wherein the communication processor, the IFIC, and the RFIC are disposed on the first PCB, and
   wherein the first antenna module and the second antenna module are disposed within 2 cm from the RFIC.

3. The portable communication device of claim 1, wherein the first polarization includes a horizontal polarization and the second polarization includes a vertical polarization,
   wherein the first splitter is configured to split the first RF signals to generate N first split RF signals for the N number of the first antenna elements of the first antenna array or split the second RF signals to generate M second split RF signals for the M number of the second antenna elements of the second antenna array, and
   wherein the second splitter is configured to split the third RF signals to generate N third split RF signals for the N number of the first antenna elements of the first antenna array or split the fourth RF signals to generate M fourth split RF signals for the M number of the second antenna elements of the second antenna array.

4. The portable communication device of claim 1, further comprising:
   a first transmission or reception chain; and
   a second transmission or reception chain,
   wherein the first transmission or reception chain electrically connects the RFIC and the first antenna array, and the second transmission or reception chain electrically connects the RFIC and the second antenna array.

5. The portable communication device of claim 1, further comprising:
   a power management integrated circuit (PMIC) disposed on the first PCB,
   wherein the PMIC is configured to supply power to the RFIC.

6. The portable communication device of claim 1, wherein the RFIC further includes:
   a local oscillator (LO) connected to the first mixer for the first polarization and the second mixer for the second polarization.

7. The portable communication device of claim 1, wherein the communication processor is further configured to:
   control the switches of the first splitter to transmit the first split RF signals to the first antenna array or the second split RF signals to the second antenna array, and
   control the switches of the second splitter to transmit the third split RF signals to the first antenna array or the fourth split RF signals to the second antenna array.

8. The portable communication device of claim 1, wherein the number of the first split RF signals corresponds to the N number of the first antenna elements, and
   wherein the number of the third split RF signals corresponds to the N number of the first antenna elements.

9. The portable communication device of claim 1, wherein the number of the second split RF signals corresponds to the M number of the second antenna elements, and
   wherein the number of fourth split RF signals corresponds to the M number of the second antenna elements.

10. A portable communication device comprising:
   a back cover forming a rear side of the portable communication device;
   a first printed circuit board (PCB);
   a communication processor;
   an intermediate frequency integrated circuit (IFIC);
   a radio frequency integrated circuit (RFIC) converting intermediate frequency (IF) signals received from the IFIC into radio frequency (RF) signals and supporting a mmWave communication,
   wherein the communication processor, the IFIC, and the RFIC are disposed on the first PCB, and
   wherein the RFIC includes:
      a first mixer for a first polarization,
      a second mixer for a second polarization,
      a first splitter connected to the first mixer,
      a second splitter connected to the second mixer, and
      a plurality of phase shifters;
   a first antenna module electrically connected with the first PCB through a flexible printed circuit board (FPCB) and including a second PCB and a first antenna array, wherein the first antenna array includes N number of first antenna elements disposed on the second PCB; and
   a second antenna module including a third PCB and a second antenna array including M number of second antenna elements disposed on the third PCB, wherein M is different from N,
   wherein the first mixer of the RFIC is configured to:
      receive, from the IFIC, first IF signals for the first polarization,
      convert the first IF signals into first RF signals for the first polarization,
      transmit, to the first splitter, the first RF signals for the first antenna module,
      receive, from the IFIC, second IF signals for the first polarization,
      convert the second IF signals into second RF signals for the first polarization, and
      transmit, to the first splitter, the second RF signals for the second antenna module, and
   wherein the second mixer of the RFIC is configured to:
      receive, from the IFIC, third IF signals for the second polarization, convert the third IF signals into third RF signals for the second polarization,
transmit, to the second splitter, the third RF signals for the first antenna module,
receive, from the IFIC, fourth IF signals for the second polarization,
convert the fourth IF signals into fourth RF signals for the second polarization, and
transmit, to the second splitter, the fourth RF signals for the second antenna module,
wherein, when the first RF signals are transmitted from the first mixer to the first splitter and the third RF signals are transmitted from the second mixer to the second splitter, the first splitter is configured to generate first split RF signals by splitting the first RF signals according to the N number of the first antenna elements, and the second splitter is configured to generate third split RF signals by splitting the third RF signals according to the N number of the first antenna elements,
wherein, when the second RF signals are transmitted from the first mixer to the first splitter and the fourth RF signals are transmitted from the second mixer to the second splitter, the first splitter is configured to generate second split RF signals by splitting the second RF signals according to the M number of the second antenna elements, and the second splitter is configured to generate fourth split RF signals by splitting the fourth RF signals according to the M number of the second antenna elements,
wherein switches of the first splitter and switches of the second splitter are configured according to the N number of the first antenna elements differently than when the switches of the first splitter and the switches of the second splitter are configured according to the M number of the second antenna elements,
wherein first phases of the first split RF signals and third phases of the third split RF signals are shifted by the RFIC including the plurality of phase shifters, and first signals having the shifted first phases and third signals having the shifted third phases are received by the first antenna module through the FPCB such that the first antenna array transmits first wireless signals corresponding to the first signals having the shifted first phases and third wireless signals corresponding to the third signals having the shifted third phases, and
wherein second phases of the second split RF signals and fourth phases of the fourth split RF signals are shifted by the RFIC including the plurality of phase shifters, and second signals having the shifted second phases and fourth signals having the shifted fourth phases are received by the second antenna module mounted on the first PCB such that the second antenna array facing the back cover transmits second wireless signals corresponding to the second signals having the shifted second phases and fourth wireless signals corresponding to the fourth signals having the shifted fourth phases in a direction toward the back cover.

11. The portable communication device of claim 10, wherein the first polarization includes a horizontal polarization and the second polarization includes a vertical polarization,
wherein the first splitter is configured to split the first RF signals to generate N split first RF signals for the N number of the first antenna elements of the first antenna array or split the second RF signals to generate M second split RF signals for the M number of the second antenna elements of the second antenna array, and
wherein the second splitter is configured to split the third RF signals to generate N third split RF signals for the N number of the first antenna elements of the first antenna array or split the fourth RF signals to generate M fourth split RF signals for the M number of the second antenna elements of the second antenna array.

12. The portable communication device of claim 10, further comprising:
a first transmission or reception chain; and
a second transmission or reception chain,
wherein the first transmission or reception chain electrically connects the RFIC and the first antenna array, and the second transmission or reception chain electrically connects the RFIC and the second antenna array.

* * * * *